United States Patent
Kitazato

(10) Patent No.: US 9,967,613 B2
(45) Date of Patent: *May 8, 2018

(54) RECEPTION DEVICE, RECEPTION METHOD, PROGRAM, AND INFORMATION PROCESSING SYSTEM

(71) Applicant: SATURN LICENSING LLC, New York, NY (US)

(72) Inventor: Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/290,814

(22) Filed: Oct. 11, 2016

(65) Prior Publication Data

US 2017/0034573 A1 Feb. 2, 2017

Related U.S. Application Data

(63) Continuation of application No. 14/241,759, filed as application No. PCT/JP2012/072354 on Sep. 3, 2012, now Pat. No. 9,503,778.

(30) Foreign Application Priority Data

Sep. 22, 2011 (JP) ................................. 2011-207842

(51) Int. Cl.
*H04N 21/23* (2011.01)
*H04N 21/434* (2011.01)
(Continued)

(52) U.S. Cl.
CPC ....... *H04N 21/4345* (2013.01); *H04N 21/237* (2013.01); *H04N 21/23418* (2013.01);
(Continued)

(58) Field of Classification Search
None
See application file for complete search history.

(56) References Cited

U.S. PATENT DOCUMENTS

2001/0046069 A1 11/2001 Jones
2002/0033844 A1 3/2002 Levy et al.
(Continued)

FOREIGN PATENT DOCUMENTS

CN 101218819 A 7/2008
CN 101562689 A 10/2009
(Continued)

OTHER PUBLICATIONS

Office Action dated Oct. 10, 2016 in Chinese Patent Application No. 201280044760.1 (English translation only).
(Continued)

*Primary Examiner* — Cai Chen
(74) *Attorney, Agent, or Firm* — Oblon, McClelland, Maier & Neustadt, L.L.P.

(57) ABSTRACT

Provided is a reception device including a reception unit configured to receive AV content, a feature value extraction unit configured to extract a feature value from data of the received AV content, an identification result acquisition unit configured to acquire an identification result of the AV content identified using the extracted feature value, a command acquisition unit configured to acquire a command for controlling an operation of an application program that is executed in linkage with the AV content according to the acquired identification result, a control unit configured to control the operation of the application program according to the acquired command, and a detection unit configured to detect switching of the AV content being viewed. When the
(Continued)

switching of the AV content is detected, the control unit closes the application program that has been executed in linkage with the AV content.

12 Claims, 23 Drawing Sheets

(51) Int. Cl.

| | | |
|---|---|---|
| H04N 21/438 | (2011.01) | |
| H04N 21/44 | (2011.01) | |
| H04N 21/858 | (2011.01) | |
| H04N 21/234 | (2011.01) | |
| H04N 21/237 | (2011.01) | |
| H04N 21/41 | (2011.01) | |
| H04N 21/422 | (2011.01) | |
| H04N 21/43 | (2011.01) | |
| H04N 21/431 | (2011.01) | |
| H04N 21/439 | (2011.01) | |
| H04N 21/4363 | (2011.01) | |

(52) U.S. Cl.
CPC ... *H04N 21/4122* (2013.01); *H04N 21/42221* (2013.01); *H04N 21/4307* (2013.01); *H04N 21/4316* (2013.01); *H04N 21/4383* (2013.01); *H04N 21/4394* (2013.01); *H04N 21/44008* (2013.01); *H04N 21/858* (2013.01); *H04N 21/43635* (2013.01)

(56) References Cited

U.S. PATENT DOCUMENTS

| | | |
|---|---|---|
| 2002/0062382 A1 | 5/2002 | Rhoads et al. |
| 2003/0187798 A1 | 10/2003 | McKinley et al. |
| 2005/0015802 A1 | 1/2005 | Masson |
| 2005/0192933 A1 | 9/2005 | Rhoads et al. |
| 2007/0055689 A1 | 3/2007 | Rhoads et al. |
| 2008/0049971 A1 | 2/2008 | Ramos et al. |
| 2008/0082618 A1 | 4/2008 | Jones |
| 2008/0256115 A1* | 10/2008 | Beletski ............ G06F 17/30056 |
| 2008/0275906 A1 | 11/2008 | Rhoads et al. |
| 2009/0138484 A1 | 5/2009 | Ramos et al. |
| 2009/0281643 A1 | 11/2009 | Higuchi |
| 2010/0138873 A1* | 6/2010 | Terada ............... H04N 5/44543 725/56 |
| 2011/0061086 A1 | 3/2011 | Huang |
| 2011/0063503 A1 | 3/2011 | Brand et al. |
| 2011/0154200 A1 | 6/2011 | Davis et al. |
| 2012/0029670 A1* | 2/2012 | Mont-Reynaud . G06F 17/30743 700/94 |
| 2014/0067922 A1 | 3/2014 | Yamagishi et al. |

FOREIGN PATENT DOCUMENTS

| | | |
|---|---|---|
| JP | 2005-510145 A | 4/2005 |
| JP | 2006-245653 A | 9/2006 |
| JP | 2010-182323 A | 8/2010 |
| JP | 2011-155317 A | 8/2011 |
| WO | WO 2006/126852 A1 | 11/2006 |
| WO | WO 2007/043483 A1 | 4/2007 |

OTHER PUBLICATIONS

Christopher Howson, et al., "Second Screen TV Synchronization", 2011 IEEE International Conference on Consumer Electronics, 2011, pp. 361-365.

International Search Report dated Oct. 9, 2012 in PCT/JP2012/072354.

Combined Chinese Office Action and Search Report dated Oct. 10, 2016 in Patent Application No. 201280044760.1 (with English language translation).

Extended European Search Report dated Feb. 16, 2015 in Patent Application No. 12833101.4.

Office Action dated Jun. 27, 2017 in European Patent Application No. 12833101.4.

* cited by examiner

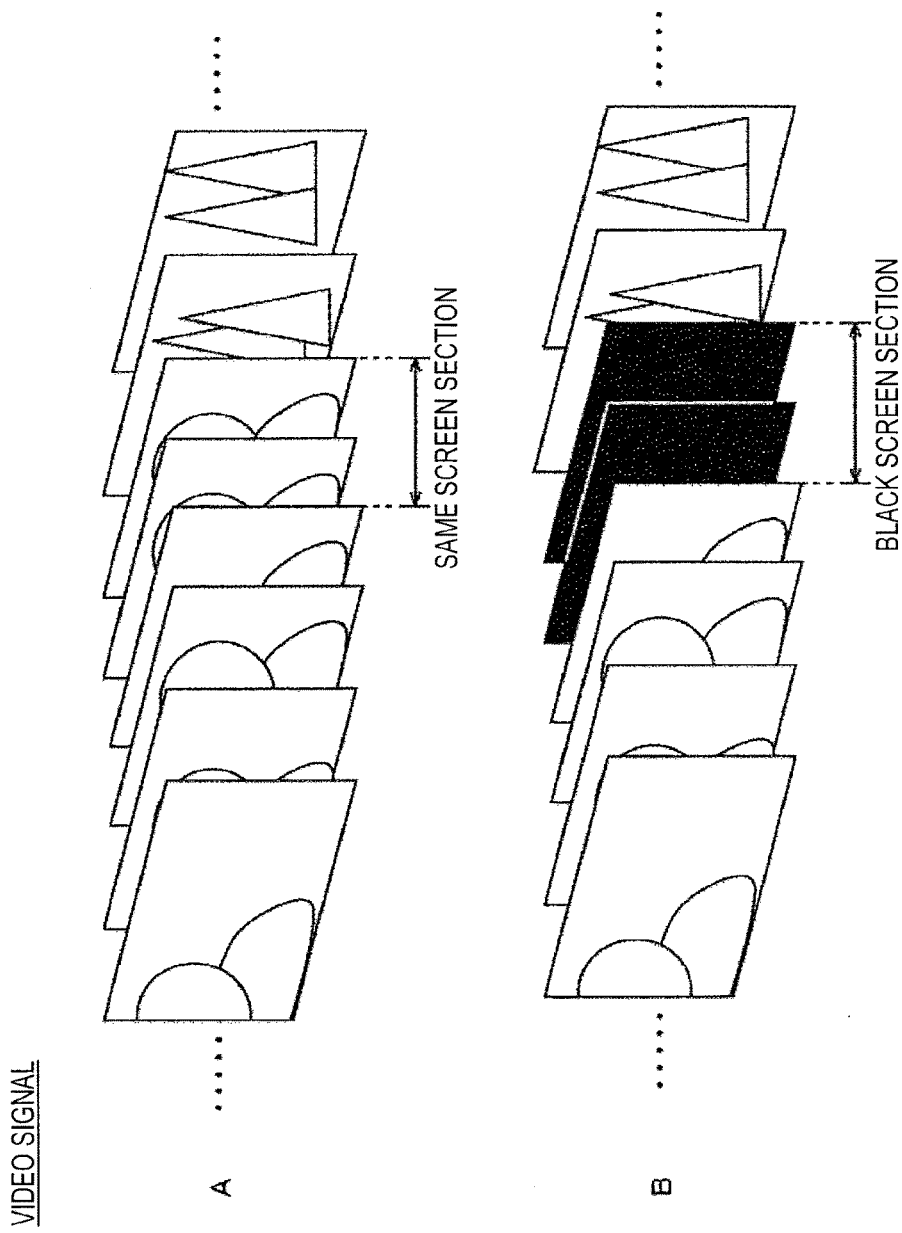

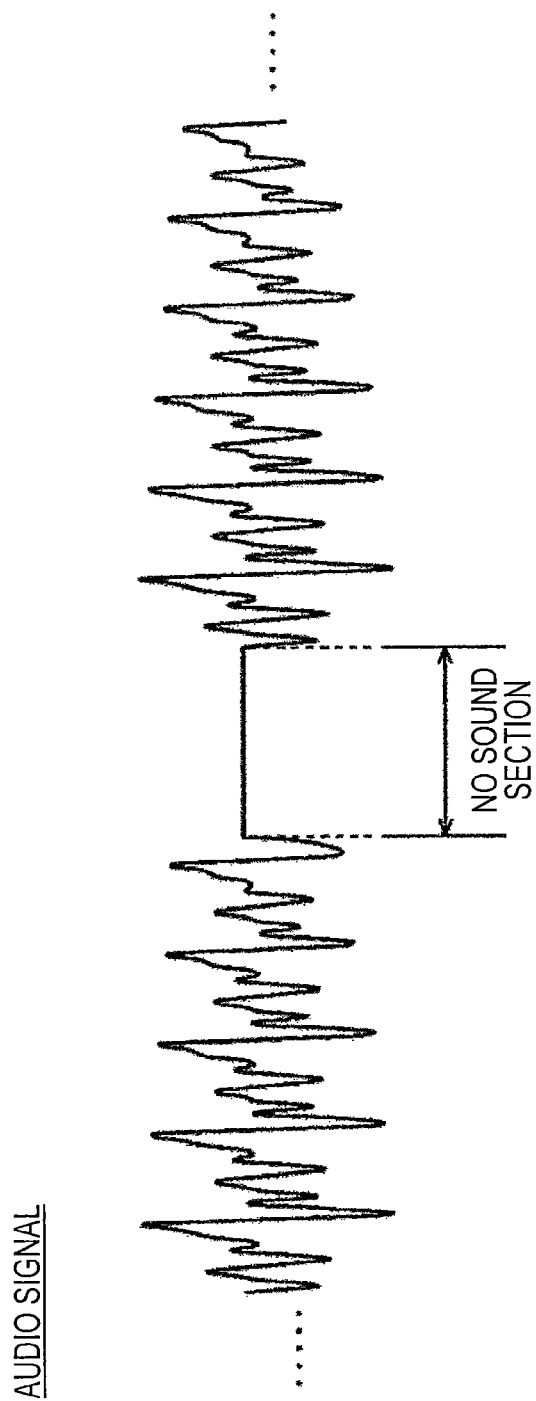

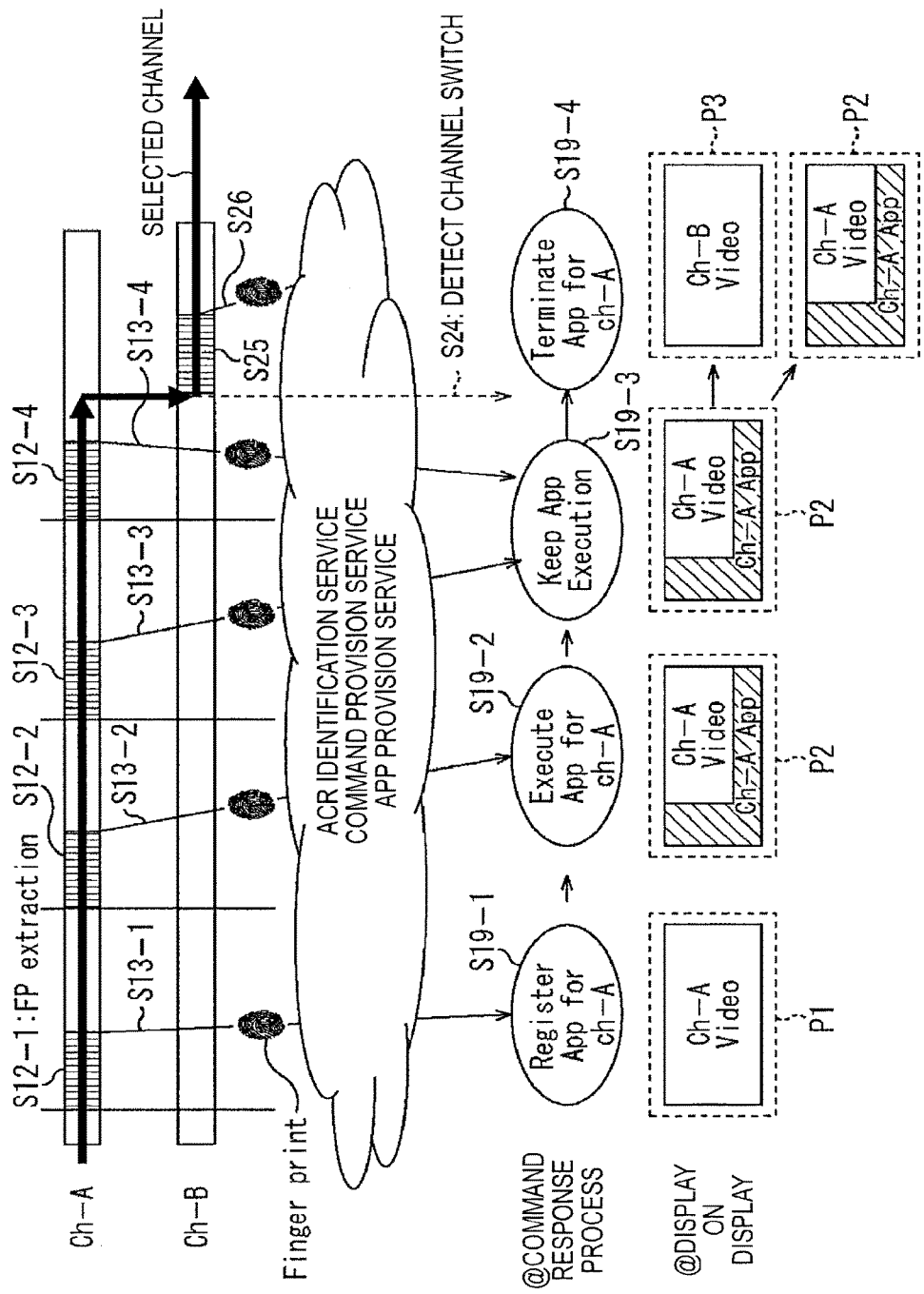

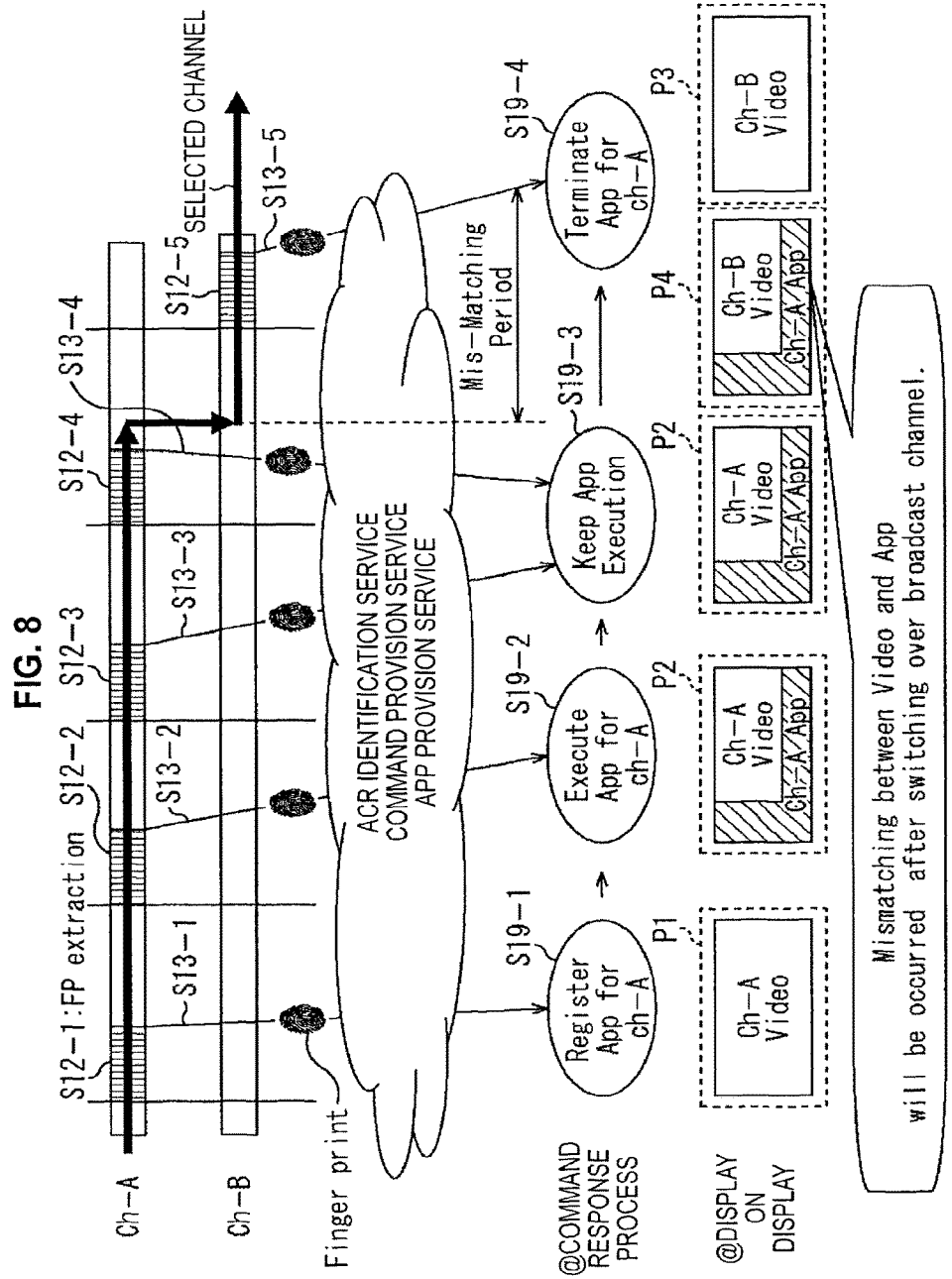

FIG. 9

| INFORMATION ITEM | CONTENT |
|---|---|
| COMMAND ID | ID FOR IDENTIFYING SPECIFIC COMMAND |
| COMMAND EFFECTUATION TIME | EXPRESSED BY ANY OF ABSOLUTE DATE AND TIME, RELATIVE TIME, AND PTS WHICH INDICATE TIME TO EXECUTE COMMAND. IMMEDIATELY EFFECTUATED WHEN IT PASSES |
| TYPE OF COMMAND TARGET DEVICE | TARGET DEVICE FOR APP CONTROL USING COMMAND. "MAIN BODY OF RECEPTION DEVICE," "EXTERNAL DEVICE TYPE 1," "EXTERNAL DEVICE TYPE 2,"... |
| COMMAND ACTION | INDICATE ACTION OF TERMINAL BASED ON COMMAND. FIVE KINDS OF "APP ACQUISITION," "APP ACTIVATION," "APP CLOSING," "EVENT TRIGGERING," AND "APP STOPPING" |
| COMMAND APPLICATION DISTRIBUTION PARAMETER | PARAMETER FOR STOCHASTICALLY DISTRIBUTING TIMING AT WHICH COMMAND IS APPLIED TO TARGET DEVICE. AIMS FOR DISTRIBUTION OF ACCESS TO SERVER |
| APP ID | ID OF TARGET APPLICATION |
| TYPE OF APP | TYPE OF APPLICATION |
| SERVICE PROVIDER ID | ID INDICATING SERVICE PROVIDER (NOT NECESSARY WHEN INCLUDED IN APP ID) |
| APP URL | ACQUISITION SOURCE URL OF APPLICATION |
| APP EXPIRATION DATE | EXPIRATION DATE AND TIME TO CANCEL APPLICATION |
| APP HOLDING PRIORITY | HOLDING PRIORITY WHEN CAPACITY OF HOLDING APPLICATION IS INSUFFICIENT |
| EVENT ID | EVENT ID IN CASE OF "EVENT TRIGGERING" |
| EVENT ADDITION DATA | DATA USED IN APPLICATION IN ACCORDANCE WITH EVENT TRIGGERING IN CASE OF "EVENT TRIGGERING" |

FIG. 10

| ELEMENT (ATTRIBUTE) | | | NUMBER OF APPEARANCE TIMES | DEFINITION AND DETAILED OPERATION |
|---|---|---|---|---|
| command | | | 1 | |
| | @destination | | 1 | COMMAND-APPLIED DEVICE<br>"receiver" MAIN BODY OF RECEPTION DEVICE<br>"external_1" EXTERNAL DEVICE TYPE 1<br>"external_2" EXTERNAL DEVICE TYPE 2 |
| | @action | | 1 | CONTENT OF COMMAND<br>"execute" APP EXECUTION<br>"register" APP REGISTRATION<br>"suspend" APP STOP<br>"terminate" APP CLOSING<br>"event" EVENT TRIGGERING |
| timing | | | 0..1 | DESIGNATION OF DETAILED TIMING OF COMMAND APPLICATION |
| | @unit | | 1 | TIMING DESIGNATION METHOD<br>"utc" ABSOLUTE DATE AND TIME<br>"smpte" RELATIVE TIME<br>"pts" BROADCAST PTS VALUE |
| diffusion | | | 0..1 | DIFFUSION OF COMMAND APPLICATION TIMING |
| | @rate | | 1 | NUMBER OF DIVISIONS |
| | @range | | 1 | MAXIMUM DELAY TIME |
| | @period | | 1 | COMMAND APPLICATION DIFFUSION PERIOD |

FIG. 11

| ELEMENT (ATTRIBUTE) | | NUMBER OF APPEARANCE TIMES | DEFINITION AND DETAILED OPERATION |
|---|---|---|---|
| application | | 1 | DESCRIPTION OF TARGET APPLICATION |
| | @id | 1 | APPLICATION ID |
| | @type | 1 | TYPE OF APPLICATION |
| | @url | 0..1 | ACQUISITION SOURCE URL OF APPLICATION NECESSARY FOR "execute" and "register" |
| | @priority | 0..1 | APPLICATION HOLDING PRIORITY 1:High 0:Normal |
| | @expire_date | 0..1 | APPLICATION EXPIRATION DATE NECESSARY FOR "execute" and "register" |
| event | | 0..1 | APPLICATION EVENT NECESSARY FOR "event" |
| | @id | 1 | EVENT ID |
| | data | 0..1 | DATA INPUT TO APP IN RELATION TO EVENT |

FIG. 12

```
<command destination="receiver" action="execute">
  <timing unit="pts"> 1286743 </timing>
  <application id="1" type="html" url="xxx.com/yyy" expire_date="2011-01-21">
</command>
```

RECEPTION DEVICE, RECEPTION METHOD, PROGRAM, AND INFORMATION PROCESSING SYSTEM

CROSS-REFERENCE TO RELATED APPLICATIONS

The present application is a continuation of U.S. application Ser. No. 14/241,759, filed on Feb. 27, 2014, and is based on PCT filing PCT/JP2012/072354 filed on Sep. 3, 2012, and JP 2011-207842, filed Sep. 22, 2011, the entire contents of each of which are incorporated herein by reference.

TECHNICAL FIELD

The present technology relates to a reception device, a reception method, a program, and an information processing system, and particularly to a reception device, a reception method, a program, and an information processing system that can provide an application program that is executed in linkage with AV content using an ACR technology.

BACKGROUND ART

Using a reception device that receives digital television broadcasting signals, a service in which an application program executed in linkage with AV content such as a digital television program is acquired from a server that is connected to the Internet and then executed is expected to be distributed. For this reason, a technology for realizing a hybrid service in which such broadcasting is combined with communication has been discussed (for example, Patent Literature 1).

In addition, realization of a hybrid service of broadcasting and communication provided in such a way that, when a terrestrial broadcast is received via a CATV network of a satellite communication network, rather than being directly received, control signals synchronized with signals of such a broadcast are transmitted has been discussed, however, it is currently difficult to realize the service unless facilities of existing CATV networks, satellite broadcasting networks and dedicated terminals are renovated.

CITATION LIST

Patent Literature

Patent Literature 1: JP 2006-245653A

SUMMARY OF INVENTION

Technical Problem

However, there is a technology which is called ACR (Automatic Content Recognition) for identifying AV content such as a program. In the ACR technology, AV content is identified by comparing a feature value extracted from a video signal and an audio signal of the AV content to be identified with a database in which feature values extracted from video signals and audio signals of a number of kinds of AV content are registered in advance.

If AV content can be identified using the ACR technology and further an application program executed in linkage with the identified AV content can be provided, such a hybrid service of broadcasting and communication can be realized. However, at present, no technology for providing an application program that is executed in linkage with AV content using the ACR technology has been established.

It is desirable to provide an application program that is executed in linkage with AV content using the ACR technology.

Solution to Problem

According to a first embodiment of the present technology, there is provided a reception device including a reception unit configured to receive AV content, a feature value extraction unit configured to extract a feature value from data of the received AV content, an identification result acquisition unit configured to acquire an identification result of the AV content identified using the extracted feature value, a command acquisition unit configured to acquire a command for controlling an operation of an application program that is executed in linkage with the AV content according to the acquired identification result, a control unit configured to control the operation of the application program according to the acquired command, and a detection unit configured to detect switching of the AV content being viewed. When the switching of the AV content is detected, the control unit closes the application program that has been executed in linkage with the AV content.

The detection unit detects switching of a channel from first AV content to second AV content that is different from the first AV content. When the switching of the channel from the first AV content to the second AV content is detected, the control unit closes the application program that has been executed in linkage with the first AV content.

The reception device further includes a storage unit configured to store first identification information for identifying the first AV content obtained from the identification result of the first AV content. When the switching of the channel from the first AV content to the second AV content is detected, the feature value extraction unit extracts a feature value from data of the second AV content. The identification result acquisition unit acquires an identification result of the second AV content identified using the extracted feature value. When the stored first identification information is different from a second identification result for identifying the second AV content obtained from the identification result of the second AV content, the control unit closes the application program.

The reception unit directly receives the AV content transmitted from a transmission device. According to an operation on the reception device for switching the channel from the first AV content to the second AV content, the detection unit detects the switching of the channel.

The reception unit receives the AV content that has been converted from an information processing device when the reception unit is connected to the information processing device that converts data of the AV content transmitted from a transmission device according to the reception device in a scheme based on an HDMI (High Definition Multimedia Interface) standard. The detection unit detects the switching of the channel from the first AV content to the second AV content according to an analysis result of a video signal of the AV content received from the information processing device.

The detection unit detects the switching of the channel by analyzing, based on the video signal of the AV content received from the information processing device, whether a plurality of frames constituting the AV content are continuous in a predetermined section to form a same screen or whether the plurality of frames are continuous in a predetermined section to form a black screen.

The detection unit detects the switching of the channel from the first AV content to the second AV content according to an analysis result of an audio signal of the AV content received from the information processing device.

The detection unit detects the switching of the channel by analyzing, based on the audio signal of the AV content received from the information processing device, whether a sample of the audio signal is in a no signal state in a predetermined section or whether the sample is in a discontinuous state in a predetermined section.

The reception unit receives the AV content that has been converted from an information processing device when the reception unit is connected to the information processing device that converts data of the AV content transmitted from a transmission device according to the reception device in a scheme based on an HDMI standard. According to an operation on the information processing device for switching the channel from the first AV content to the second AV content, the detection unit detects the switching of the channel.

The reception unit receives the AV content output from a selector when the reception unit is connected to the selector that selects desired AV content from a plurality of pieces of AV content input from a plurality of information processing devices and then outputs the desired AV content in a scheme based on an HDMI standard. The detection unit detects switching of the AV content being viewed according to a selection result of the AV content provided by the selector.

The identification result acquisition unit acquires an identification result of the AV content identified from the extracted feature value using an ACR (Automatic Content Recognition) technology.

The feature value extraction unit extracts the feature value from one or both of a video signal and an audio signal of the AV content.

The command indicates any of acquisition or registration, acquisition or activation, event triggering, stopping, and closing of the application program. The control unit controls acquisition or registration, or acquisition or activation of the application program, or event triggering, pausing, or closing of the application program being executed according to each command.

The reception device may be an independent device, or an internal block constituting one device.

A reception method or a program according to the first embodiment of the present technology is a reception method or a program corresponding to the reception device according to the first embodiment of the present technology.

According to the reception device, the reception method, and the program of the first aspect of the present technology, AV content is received, a feature value is extracted from data or the received AV content, an identification result of the AV content identified using the extracted feature value is acquired, a command for controlling an operation of an application program executed in linkage with the AV content is acquired according to the acquired identification result, an operation of the application program is controlled according to the acquired command, switching of the AV content being viewed is detected, and when the switching of the AV content is detected, the application program executed in linkage with the AV content is closed.

According to the second embodiment of the present technology, there is provided an information processing system including a reception device, a first information processing device, a second information processing device, and a third information processing device. The reception device includes a reception unit configured to receive AV content, a feature value extraction unit configured to extract a feature value from data of the received AV content, an identification result acquisition unit configured to transmit the extracted feature value to the first information processing device and to thereby acquire an identification result of the AV content identified by the first information processing device using the feature value, a command acquisition unit configured to transmit the identification result acquired from the first information processing device to the second information processing device and to thereby acquire, from the second information processing device, a command for controlling an operation of an application program that is executed in linkage with the AV content according to the identification result, a control unit configured to control the operation of the application program that is acquired from the third information processing device according to the command acquired from the second information processing device, and a detection unit configured to detect switching of the AV content being viewed. When the switching of the AV content is detected, the control unit closes the application program that has been executed in linkage with the AV content. The first information processing device includes a first providing unit configured to provide the identification result obtained by identifying the AV content using the feature value in response to an inquiry from the reception device. The second information processing device includes a second providing unit configured to provide the command according to the identification result in response to an inquiry from the reception device. The third information processing device includes a third providing unit configured to provide the application program according to the command in response to an inquiry from the reception device.

The information processing system according to the second embodiment of the present technology includes a reception device, a first information processing device, a second information processing device, and a third information processing device. The reception device receives AV content, extracts a feature value from data of the received AV content, transmits the extracted feature value to the first information processing device, thereby acquires an identification result of the AV content identified by the first information processing device using the feature value, transmits the identification result acquired from the first information processing device to the second information processing device, thereby acquires, from the second information processing device, a command for controlling an operation of an application program that is executed in linkage with the AV content according to the identification result, controls the operation of the application program that is acquired from the third information processing device according to the command acquired from the second information processing device, and detects switching of the AV content being viewed. When the switching of the AV content is detected, the reception device closes the application program that has been executed in linkage with the AV content. The first information processing device provides the identification result obtained by identifying the AV content using the feature value in response to an inquiry from the reception device. The second information processing device provides the command according to the identification result in response to an inquiry from the reception device. The third information processing device provides the application program according to the command in response to an inquiry from the reception device.

Advantageous Effects of Invention

According to the first and the second aspects of the present technology, an application program that is executed in linkage with AV content using the ACR technology can be provided.

BRIEF DESCRIPTION OF DRAWINGS

FIG. 5 is a diagram illustrating an example of detection of channel switching using a video signal.

FIG. 6 is a diagram illustrating detection of channel switching using an audio signal.

FIG. 7 is a diagram illustrating an example of an operation of a data broadcasting app.

FIG. 8 is a diagram illustrating an example of another operation of the data broadcasting app.

FIG. 9 is a table showing an example of items of information included in a command.

FIG. 10 is a table showing detailed specifications of a command.

FIG. 11 is a table showing detailed specifications of the command.

FIG. 12 is a diagram showing a description example of a command.

DESCRIPTION OF EMBODIMENT

Hereinafter, preferred embodiments of the present technology will be described with reference to drawings.

First Embodiment

[Configuration Example of a Broadcasting System]

Figure 1:
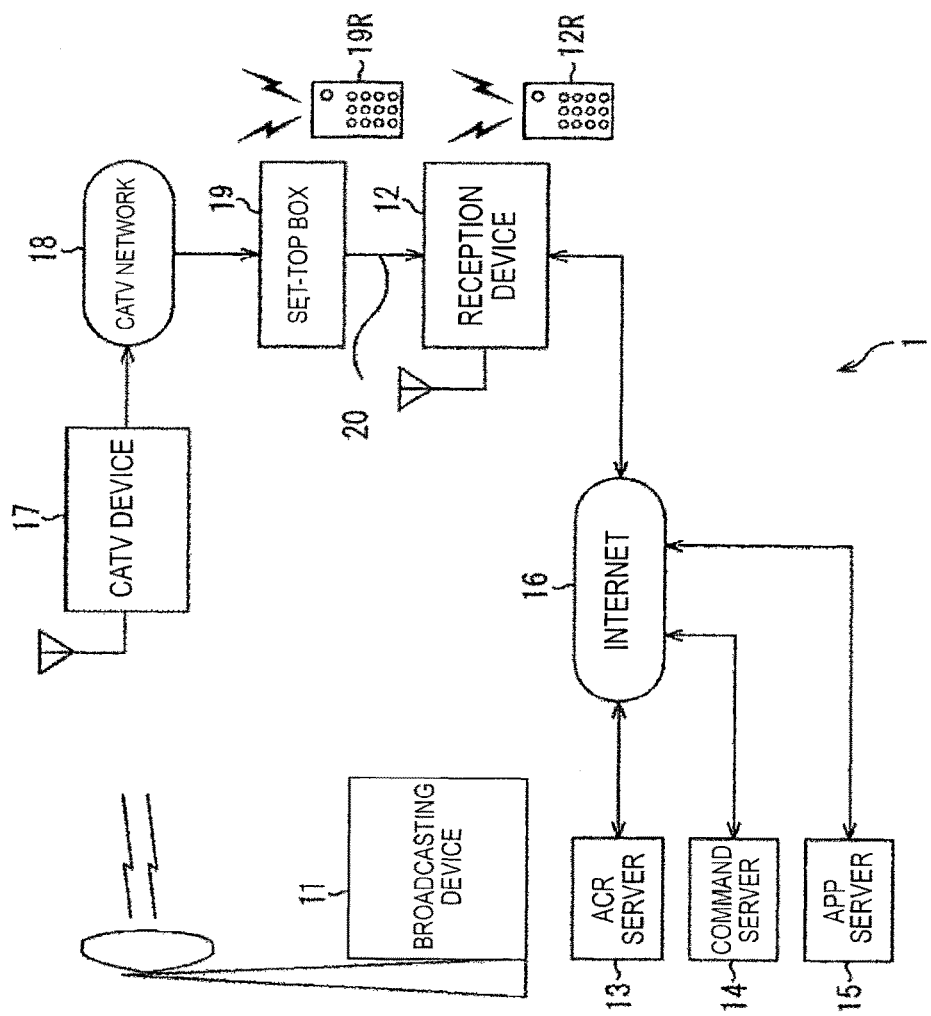
FIG. 1 is a diagram illustrating a configuration example of a broadcasting system.

FIG. 1 illustrates a broadcasting system 1 that is a first embodiment of the present technology. The broadcasting system 1 is constituted by a broadcasting device 11, a reception device 12, an ACR server 13, a command server 14, an app server 15, a CATV device 17, and a set-top box 19.

The reception device 12, the ACR server 13, the command server 14, and the app server 15 are connected to one another via the Internet 16. In addition, the reception device 12 is connected to the set-top box 19 via an HDMI cable 20, and the CATV device 17 is connected to the set-top box 19 via a CATV network 18.

The broadcasting device 11, for example, is provided by a broadcasting service provider who is broadcasting digital television programs. The broadcasting device 11 is designed to transmit (or broadcast) digital television broadcasting signals such as digital television signals of AV content. Note that, as an example of the AV content transmitted from the broadcasting device 11, description will be provided based on a digital television program.

The reception device 12 receives digital television broadcasting signals transmitted from the broadcasting device 11, and then acquires videos and sounds of a digital television program. The reception device 12 outputs acquired videos to a display (a display 32 of FIG. 2 described later), and sounds to a speaker (a speaker 31 of FIG. 2 described later).

Note that the reception device 12 may be independently present, or built in, for example, a television receiver set, a video recorder, or the like. In addition, the reception device 12 has a light sensing unit (a light sensing unit 71 of FIG. 2 to be described later) that senses infrared light to receive commands according to operations on a remote controller 12R, and performs various operations, for example, channel switching and the like according to the commands. A detailed configuration of the reception device 12 will be described later with reference to FIG. 2.

In addition, the reception device 12 periodically accesses the ACR server 13 via the Internet 16 to inquire identification results of digital television programs. In this case, feature values extracted from video signals and audio signals of a digital television program (hereinafter referred to as fingerprint information (Finger Print)) are transmitted to the ACR server 13.

The ACR server 13 has a database in which feature values extracted from video signals and audio signals of arbitrary AV content are registered, and identifies AV content using the ACR (Automatic Content Recognition) technology according to an inquiry from an arbitrary reception device 12 connected to the Internet 16. To be specific, the ACR server 13 identifies a digital television program by referring to the database for the fingerprint information transmitted from the reception device 12, and then transmits the identification result to the reception device 12 via the Internet 16.

The reception device 12 accesses the command server 14 via the Internet 16 according to the identification result received from the ACR server 13, and then acquires a command for controlling an operation of an application program for data broadcasting that is executed in linkage with the digital television program. Hereinafter, description will be provided by referring to the application program that is executed in linkage with AV content such as a digital television program as a data broadcasting app.

The command server 14 is a server that is provided by, for example, a service provider such as a broadcasting service provider or a cable television service provider and manages commands for controlling operations of the data broadcasting app. The command server 14 transmits commands to the reception device 12 via the Internet 16 according to inquiries from the reception device 12.

The reception device 12 controls operations of the data broadcasting app according to a command received from the command server 14. In addition, the reception device 12 accesses the app server 15 via the Internet 16 to acquire such a data broadcasting app according to a command received from the command server 14.

The app server 15 is a server that is provided by, for example, a service provider such as a broadcasting service provider or a cable television service provider and manages data broadcasting apps. The app server 15 transmits data broadcasting apps to the reception device 12 via the Internet 16 according to inquiries from the reception device 12.

The CATV device 17 is provided by, for example, a cable television service provider. The CATV device 17 receives digital television broadcast signals transmitted from the broadcasting device 11 and acquires videos and sounds of digital television programs. The CATV device 17 converts digital television broadcast signals into cable television broadcast signals for transmitting (broadcasting) cable television programs, and then re-transmits the converted signals to the set-top box 19 connected to the CATV network 18.

The CATV device 17 is not limited to re-transmitting a digital television program acquired from the broadcasting device 11 as a cable television program, and may transmit programs produced directly by a cable television service provider. In the description below, as an example of AV content transmitted from the CATV device 17, a cable television program will be described.

The set-top box 19 is an STB (Set Top Box) for cable televisions, and is connected to the CATV network 18. In addition, the set-top box 19 is connected to the reception device 12 that has an HDMI (High Definition Multimedia Interface) terminal via the HDMI cable 20. The set-top box 19 converts cable television broadcast signals received from the CATV device 17 via the CATV network 18 into signals that can be dealt with by the reception device 12. In addition, the set-top box 19 outputs audio signals and video signals obtained from the converted cable television broadcast signals to the reception device 12 via the HDMI cable 20 together with control signals and the like based on an HDMI standard.

Note that the set-top box 19 has a light sensing unit (not shown) that senses infrared light to receive a command according to an operation on a remote controller 19R, and performs various operations, for example, channel switching and the like according to such a command.

Figure 2:
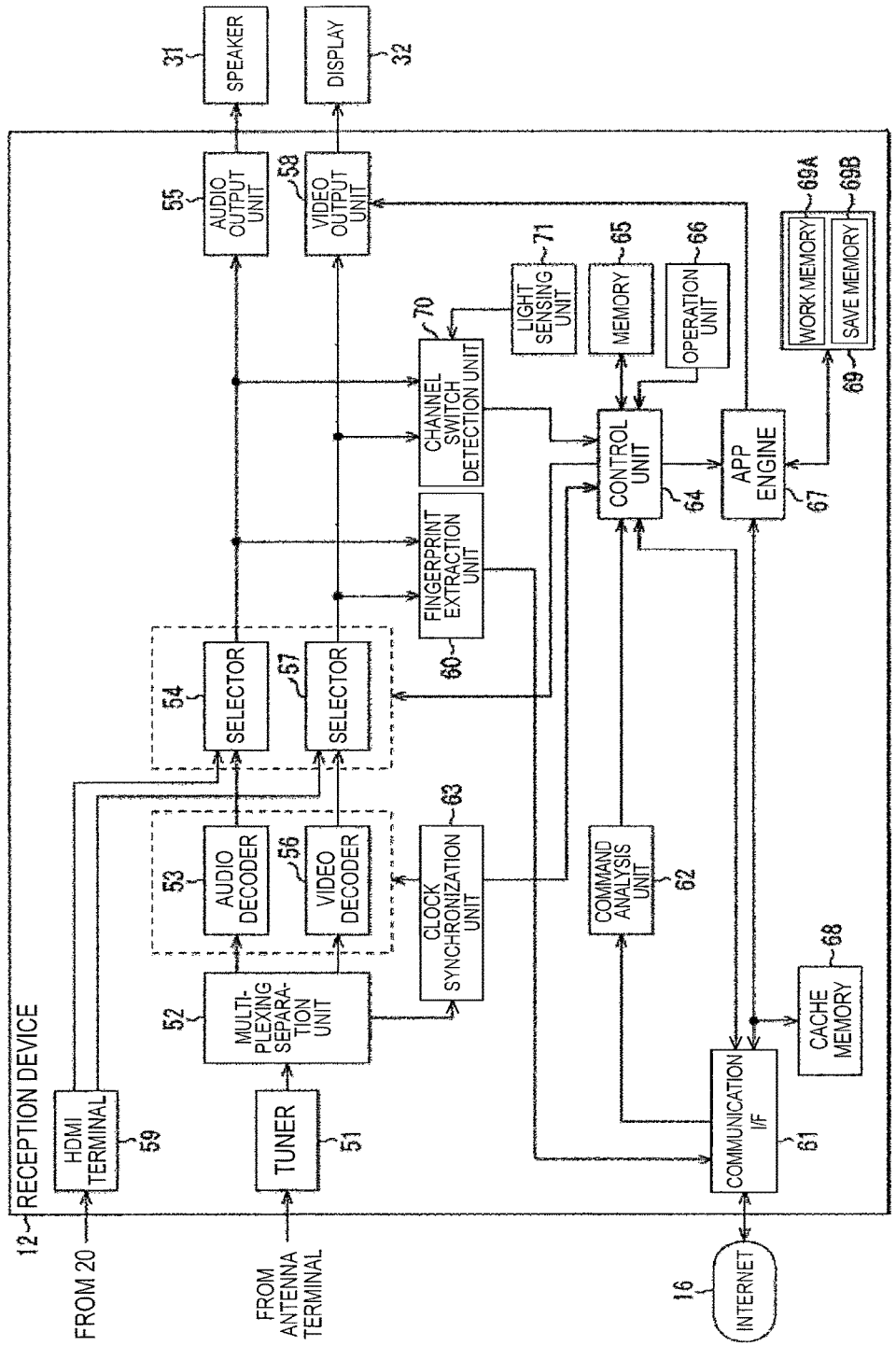
FIG. 2 is a diagram illustrating a configuration example of a reception device.

The reception device 12 receives audio signals, video signals, and other control signals from the set-top box 19, acquires videos and sounds of cable television programs, outputs the acquired videos onto the display (the display 32 of FIG. 2), and outputs the sounds to the speaker (the speaker 31 of FIG. 2).

In addition, with regard to a cable television program, the reception device 12 can access the ACR server 13 and inquire an identification result of fingerprint information extracted from data of the cable television program in the same manner as in the case of a digital television program described above. Then, the reception device 12 can acquire a command from the command server 14 and control an operation of a data broadcasting app according to the identification result from the ACR server 13. In addition, the reception device 12 can acquire a data broadcasting app from the app server 15 according to the command from the command server 14.

The broadcasting system 1 of FIG. 1 is configured as described above.

In the description below, an example in which a digital television program from the broadcasting device 11 or a cable television program from the CATV device 17 is received will be described as an example of the AV content received by the reception device 12 described above. In addition, description will be provided below by referring to a digital television program or a cable television program simply as a program if it is not necessary to distinguish the programs.

In addition, in the example of the broadcasting system of FIG. 1, although the example of the reception device 12 that is configured to be able to receive both a digital television program from the broadcasting device 11 and a cable television program from the CATV device 17 is illustrated for the sake of convenience of description, the reception device can be configured to receive only one of the programs.

[Configuration Example of the Reception Device]

FIG. 2 illustrates a configuration example of the reception device 12 of FIG. 1.

The reception device 12 is constituted by a tuner 51, a multiplexing separation unit 52, an audio decoder 53, a selector 54, an audio output unit 55, a video decoder 56, a selector 57, a video output unit 58, an HDMI terminal 59, a fingerprint extraction unit 60, a communication I/F 61, a command analysis unit 62, a clock synchronization unit 63, a control unit 64, a memory 65, an operation unit 66, an app engine 67, a cache memory 68, an app memory 69, a channel switch detection unit 70, and the light sensing unit 71.

The tuner 51 receives digital television broadcast signals from the broadcasting device 11 via an antenna (not shown). The tuner 51 demodulates the digital television broadcast signals corresponding to a channel selected by a user, and outputs a transport stream (hereinafter referred to as a TS) obtained as a result of the demodulation to the multiplexing separation unit 52.

The multiplexing separation unit 52 separates the TS input from the tuner 51 into an audio encoding signal and a video encoding signal, and outputs the signals to the audio decoder 53 and the video decoder 56. In addition, the multiplexing separation unit 52 extracts a PCR (Program Clock Reference) from TS packets included in the TS and then supplies the PCR to the clock synchronization unit 63.

The audio decoder 53 decodes the input audio encoding signal, and outputs an audio signal obtained from the result to the selector 54. The video decoder 56 decodes the input video encoding signal, and outputs a video signal obtained from the result to the selector 57.

The HDMI terminal 59 is a terminal based on the HDMI standard, and connected to the set-top box 19 via the HDMI cable 20. The HDMI terminal 59 receives audio signals and video signals together with control signals and the like output from the set-top box 19 based on the HDMI standard. Among the various kinds of received signals, the HDMI terminal 59 outputs the audio signals to the selector 54 and the video signals to the selector 57.

The selector 54 receives inputs of the audio signal from the audio decoder 53 and the audio signals from the HDMI terminal 59. The selector 54 selects an audio signal input from any one of the audio decoder 53 and the HDMI terminal 59 and then outputs the selected signal to the audio output unit 55, the fingerprint extraction unit 60, and the channel switch detection unit 70 according to control from the control unit 64. In other words, the selector 54 switches the input to the audio decoder 53 side when a digital television program is viewed, or switches the input to the HDMI terminal 59 side when a cable television program is viewed, according to the control from the control unit 64.

The selector 57 receives inputs of the video signal from the video decoder 56 and the video signals from the HDMI terminal 59. The selector 57 selects a video signal input from any one of the video decoder 56 and the HDMI terminal 59 and then outputs the selected signal to the video output unit 58, the fingerprint extraction unit 60, and the channel switch detection unit 70 according to control from the control unit 64. In other words, the selector 57 switches the input to the video decoder 56 side when a digital television program is viewed, or switches the input to the HDMI terminal 59 side when a cable television program is viewed, according to the control from the control unit 64.

The audio output unit 55 outputs the audio signal input from the selector 54 to the speaker 31. In addition, the video output unit 58 outputs the video signal input from the selector 57 to the display 32. Accordingly, videos of the AV content are displayed on the display 32, sounds thereof are output from the speaker 31, and thereby the program of a selected channel can be viewed. Note that the speaker 31 and the display 32 may be configured to be integrated with the reception device 12.

The fingerprint extraction unit 60 is supplied with the audio signal from the selector 54 and the video signal from the selector 57. The fingerprint extraction unit 60 extracts feature values from one or both of the audio signal and the video signal, and supplies the feature values to the communication I/F 61 as fingerprint information.

The communication I/F 61 transmits the fingerprint information from the fingerprint extraction unit 60 to the ACR server 13 via the Internet 16. In addition, the communication I/F 61 receives an identification result of the program transmitted from the ACR server 13, and supplies the result to the control unit 64.

The control unit 64 controls operations of each unit of the reception device 12 by executing a program for control pre-stored in the memory 65. The memory 65 stores the program for control executed by the control unit 64 in advance. The program for control can be updated based on digital television broadcasting signals or updating data acquired via the Internet 16. Further, the memory 65 appropriately stores various data output from the control unit 64. The operation unit 66 receives various operations from a user and notifies the control unit 64 of corresponding operation signals.

In addition, the control unit 64 controls the communication I/F 61 according to the identification result from the communication I/F 61, thereby accesses the command server 14 via the Internet 16, and then inquires a command. The communication I/F 61 receives a command transmitted from the command server 14, and supplies the command to the command analysis unit 62.

The command analysis unit 62 analyzes the command from the communication I/F 61, and supplies the analysis result to the control unit 64.

The clock synchronization unit 63 is configured by, for example, a PLL (Phase Locked Loop), and supplies a system clock according to a PCR from the multiplexing separation unit 52 to units of the reception device 12 such as the audio decoder 53, the video decoder 56, the control unit 64, and the like. Accordingly, since the reception device 12 can obtain the system clock synchronized with the broadcasting device 11, the reception device can reproduce audio signals and video signals.

The control unit 64 controls acquisition or registration, or acquisition or activation, event triggering, stopping, or closing of a data broadcasting app linked to the program, and the like based on the analysis result from the command analysis unit 62. In addition, the control unit 64 controls a timing for executing a command with reference to the system clock from the clock synchronization unit 63 based on the analysis result from the command analysis unit 62.

The application engine 67 controls the communication I/F 61 to access the application server 15 via the Internet 16 according to the control unit 64, and requests a data broadcasting application. The communication I/F 61 receives the data broadcasting application transmitted from the application server 15 via the Internet 16, and causes the cache memory 68 to retain the application.

The application engine 67 reads and executes the data broadcasting application retained in the cache memory 68 according to control by the control unit 64. Video signals of the executed data broadcasting application are supplied to the video output unit 58.

The video output unit 58 combines video signals input from the application engine 67 with video signals input from the selector 57, and outputs them to the display 32.

The application memory 69 includes a work memory 69A and a save memory 69B. The application engine 67 records data pertaining to the executed data broadcasting application (to be specific, which includes hierarchies of displayed information) in the work memory 69A. In addition, the application engine 67 moves data in the work memory 69A of the application memory 69 to the save memory 69B when the executed data broadcasting application is paused. Then, when the paused data broadcasting application resumes, the data in the save memory 69B is moved to the work memory 69A to restore the state before the pause.

The channel switch detection unit 70 detects switching of a program channel. To be specific, the channel switch detection unit 70 analyzes one or both of the audio signal from the selector 54 and the video signal from the selector 57, then detects switching of a program channel, and supplies the detection result to the control unit 64.

In addition, the channel switch detection unit 70 receives an input of a command from the light sensing unit 71 according to an operation on the remote controller 12R or the remote controller 19R. The channel switch detection unit 70 detects switching of a program channel based on the command from the light sensing unit 71 and then supplies the detection result to the control unit 64.

The control unit 64 controls the app engine 67 such that a data broadcasting app executed in linkage with the program is ended based on the detection result from the channel switch detection unit 70.

The reception device 12 of FIG. 2 is configured as described above.

[Associated Operation of Devices]

Figure 3:
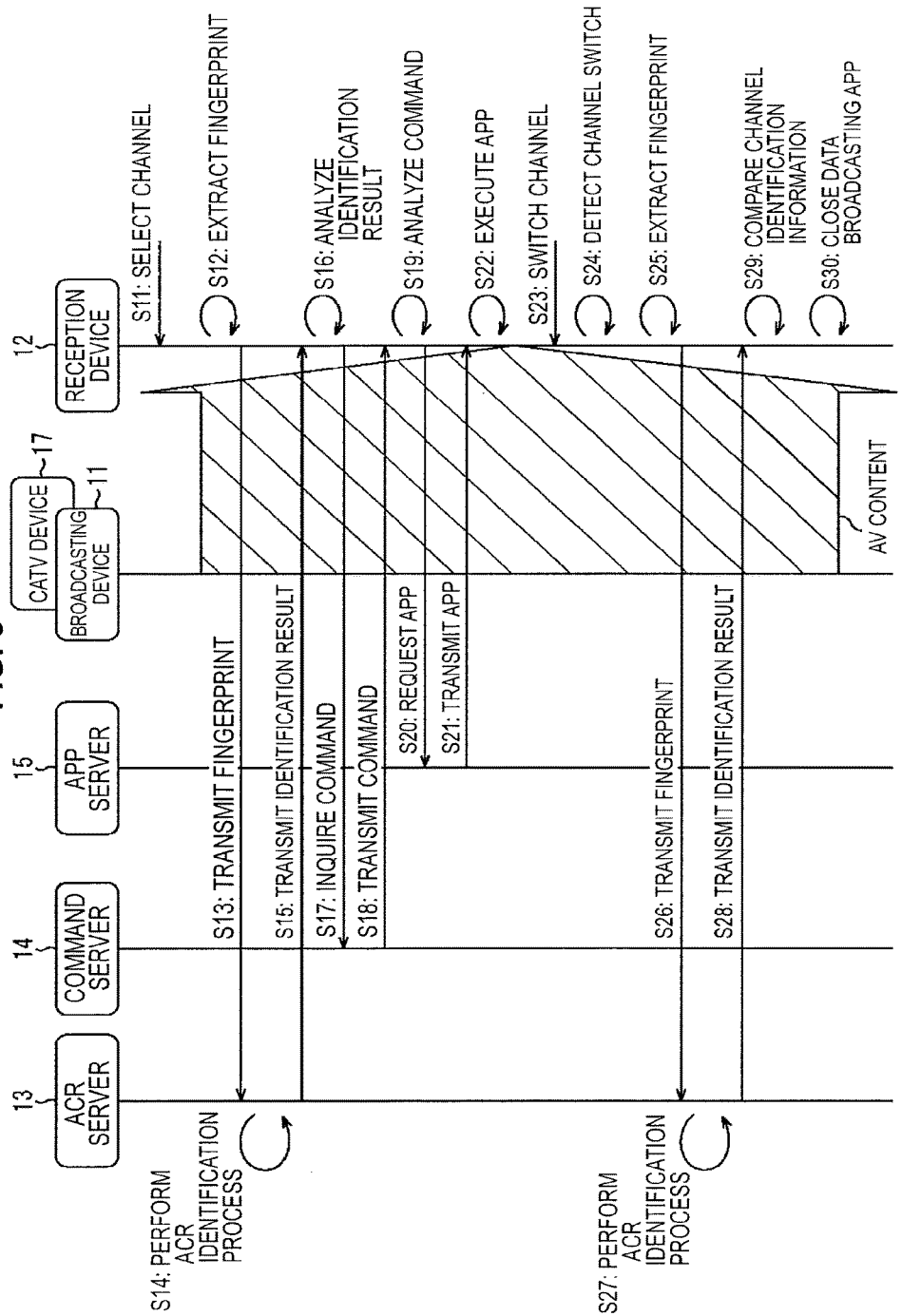
FIG. 3 is a sequence diagram illustrating an associated operation of devices.

Next, an associated operation of the devices constituting the broadcasting system 1 of FIG. 1 will be described with reference to FIGS. 3 to 8. FIG. 3 is a sequence diagram illustrating the associated operation of the devices at the time of channel selection and channel switching by the reception device 12.

As illustrated in FIG. 3, the broadcasting device 11 transmits a digital television broadcast signal, and the CATV device 17 transmits a cable television broadcast signal. When a user selects a desired channel, the reception device 12 receives any one of the digital television broadcast signal from the broadcasting device 11 or the cable television broadcast signal from the CATV device 17 via the set-top box 19. The reception device 12 displays videos of a program corresponding to the received broadcast signal on the display 32, and outputs corresponding sounds through the speaker 31 (S11).

In addition, the reception device 12 periodically extracts a feature value from the video signal and the audio signal of the program (S12), and the feature value is transmitted to the ACR server 13 as fingerprint information (S13).

Figure 4:
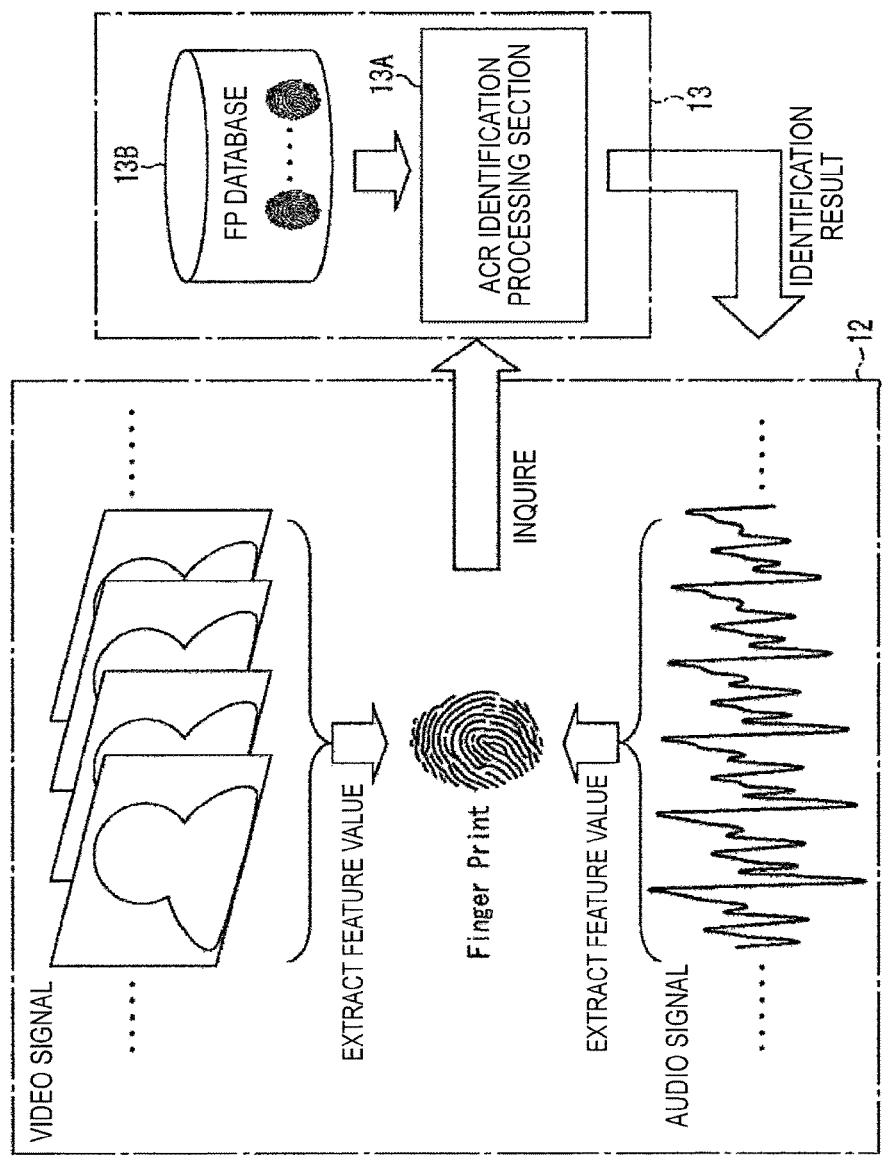
FIG. 4 is a diagram for describing the concept of the ACR technology.

The ACR server 13 performs an ACR identification process to compare the fingerprint information from the reception device 12 with the database, thereby identifying the program being selected in the reception device 12 (S14). To be specific, when the ACR server 13 receives an inquiry from the reception device 12 on the fingerprint information as illustrated in FIG. 4, an ACR identification processing section 13A compares the fingerprint information with an FP database 13B prepared in advance, thereby identifying the program being selected in the reception device 12.

Note that the fingerprint information (feature value) is, for example, unique information to all or some constituent elements of AV content, and in the FP database 13B, unique information to a number of pieces of AV content is registered in advance. In the ACR identification process, for example, the degree of similarity or conformity of the unique information is determined. As a method for determining the degree of similarity or conformity, known techniques which are disclosed in various documents and the like can be used. Using the ACR technology, the AV content can be identified based on the feature value of the video signal and the audio signal without depending on information of resolution, an aspect ratio, a bit rate, a format, or the like of the AV content.

From the ACR identification process, information for identifying a channel number of a program (hereinafter referred to as channel identification information) and information indicating a time position in which fingerprint information is extracted when the start to the end of a program are marked on a time axis (hereinafter referred to as time position information) are obtained. In addition, the FP database 13B stores information indicating an acquisition source of a command for controlling an operation of a data broadcasting app executed in linkage with the program (hereinafter referred to as command acquisition source information) in association with the channel identification information. As the command acquisition source information, for example, the URL (Uniform Resource Locator) of the command server 14 is described.

The ACR identification processing section 13A acquires the command acquisition source information corresponding to the identified channel number from the FP database 13B. Then, as an identification result of the ACR identification process, the ACR identification processing section 13A transmits the channel identification information, the time position information, and the command acquisition source information to the reception device 12 that is the source of the inquiry (S15).

The reception device 12 acquires the identification result from the ACR server 13, and then analyzes the identification result (S16). In addition, the reception device 12 accesses the command server 14 of the URL described in the command acquisition source information according to an analysis result of the identification result to transmit the channel identification information and the time position information thereto, and then inquires a command that can be executed by the reception device 12 (S17).

The command server 14 transmits the command according to the channel identification information and the time position information to the reception device 12 in response to the inquiry from the reception device 12 (S18). To be specific, for example, the command server 14 manages commands, each of which can be executed for each program, and specifies a command that can be executed in a time zone corresponding to the time position information for a program corresponding to the channel identification information from the reception device 12. For example, the command server 14 specifies one or a plurality of commands to be executed from a time at which target fingerprint information is extracted in the reception device 12 to a time at which next fingerprint information is extracted (for example, for several seconds) based on the time position information from the reception device 12. Then, the command server 14 transmits the specified command to the reception device 12 via the Internet 16.

The reception device 12 acquires the command from the command server 14, and then analyzes the command (S19). In addition, the reception device 12 accesses the app server 15 and then requests a data broadcasting app that is executed in linkage with the program being selected according to an analysis result of the command (S20).

The app server 15 transmits the data broadcasting app to the reception device 12 in response to the app request from the reception device 12 (S21). Then, the reception device 12 acquires the data broadcasting app from the app server 15 and then executes the app (S22). As a result, a video of the data broadcasting app superimposed on the program is displayed on the display 32.

Then, when the channel being selected is switched to another channel in the reception device 12 (S23), the channel switch detection unit 70 detects the switching of the channel (S24). Here, as a method for detecting channel switching of a program, for example, any one of detection methods shown below can be employed.

As a first detection method, there is a method using a channel switch command from the remote controller 12R. In this detection method, when a digital television program from the broadcasting device 11 is selected in the reception device 12 and the light sensing unit 71 receives the channel switch command from the remote controller 12R according to a selection operation of a user, the channel switch detection unit 70 can detect switch of a channel of the digital television program.

In the first detection method, since switch of a channel is detected according to a selection operation of a user, the switch of a channel can be reliably detected. Note that the channel switch command is not limited to the case in which the light sensing unit 71 senses infrared light from the remote controller 12R, and may be set to be output from the operation unit 66 to the channel switch detection unit 70 according to, for example, a selection operation on the operation unit 66 by the user.

As a second detection method, there is a method using an analysis result of a video signal of a program. In this detection method, when the reception device 12 receives a cable television program from the CATV device 17 via the set-top box 19, the channel switch detection unit 70 analyzes a video signal of the cable television program, and can thereby detect switch of a channel according to the analysis result.

As illustrated in A of FIG. 5, the channel switch detection unit 70 determines whether or not a certain section of a plurality of frames corresponding to the video signal of the cable television program continuously shows the same screen (freeze screen), and when a section in which the same screen is continuously shown is detected, the channel switch detection unit can thereby detect switch of a channel of the cable television program. To be specific, for example, the channel switch detection unit 70 obtains the differences between frames having video sample values at each position corresponding to every front and back frame, and then compares the average value thereof with a threshold value θd. Then, when there are N consecutive frames of which the average value is equal to or lower than the threshold value θd, the channel switch detection unit 70 regards that the same screen is continuously shown, and thereby detects switch of a channel.

In addition, as illustrated in B of FIG. 5, the channel switch detection unit 70 analyzes whether or not a certain section of a plurality of frames corresponding to the video signal of the cable television program continuously shows a black screen, and when a section in which the black screen is continuously shown is detected, the channel switch detection unit can thereby detect switch of a channel of the cable television program. To be specific, for example, the channel switch detection unit 70 obtains the average value of video sample values of frames, and then compares the average value with a threshold value θb. Then, when there are N consecutive frames of which the average value is equal to or lower than the threshold value θb, the channel switch detection unit 70 regards that the black screen is continuously shown, and thereby detects switch of a channel.

In other words, during channel switching, switching of a cable television program displayed on the display 32 to another program with a black screen interposed therebetween or switching of the program to another program with a freeze screen interposed therebetween is decided based on, for example, specifications and the like of the set-top box 19, not by the reception device 12. Thus, when a video signal of a cable television program is analyzed and the same screen or a black screen is continuously shown, the reception device 12 is set to be able to detect channel switch and to deal with both the screen appearances.

As a third detection method, there is a method using an analysis result of an audio signal of a program. In this detection method, when the reception device 12 receives a cable television program from the CATV device 17 via the set-top box 19, the audio signal of the cable television program is analyzed, and according to the analysis result, switch of a channel can be detected.

As illustrated in FIG. 6, the channel switch detection unit 70 analyzes that a sample of an audio signal of the cable television program is in a no signal state in a certain section or the sample is in a discontinuous state in a certain section, and when a section in the no signal state and discontinuous state is detected, the channel switch detection unit can detect switch of a channel of the cable television program. To be specific, for example, the channel switch detection unit 70 obtains the level of sound energy at a predetermined time interval, and then compares the level with a threshold value θs. Then, when a time in which the level of sound energy is equal to or lower than the threshold value θs continues for M seconds, the channel switch detection unit 70 can regard that the section is in the no signal state. In addition, for example, the channel switch detection unit 70 obtains the difference between a prediction sample value obtained from linear prediction of the audio signal and an actual sample value that was actually measured, and then compares the difference with a threshold value θa. Then, when the difference is equal to or higher than the threshold value θa, the channel switch detection unit 70 can regard that the section is in the discontinuous state.

Note that, since switch of a channel is detected based on analysis results of both a video and a sound by simultaneously performing detection using the second detection method and the third detection method, detection accuracy can be further enhanced, however, detection using the second detection method or detection using the third detection method may be performed separately. In addition, the third detection method includes detecting the no signal state and the discontinuous state, and although detection of both of the states can further enhance detection accuracy, either state of the no signal state or the discontinuous state may be detected.

In addition, a channel may be regarded as being switched when, for example, detection of the same screen or a black screen for the video signal and detection of the no signal state or the discontinuous state for the audio signal as shown in the second detection method and the third detection method are performed, points are given according to the detection state, and a total of the points is equal to or higher than a pre-set value.

As a fourth detection method, there is a method using a channel switch command from the remote controller 19R. In this detection method, when the reception device 12 selects a cable television program from the CATV device 17, and the light sensing unit 71 receives a channel switch command from the remote controller 19R according to a selection operation of a user, the channel switch detection unit 70 can detect switch of a channel of the cable television program.

To be specific, since the reception device 12 is not capable of identifying a command from the remote controller 19R, when the light sensing unit 71 receives an unidentifiable command, the reception device can regard that a channel of a cable television program has been switched. However, since such a command from the remote controller 19R is not a command corresponding to a channel switch in every case, a command response table to be used in the set-top box 19 may be set in the reception device 12 in advance, and then a command from the remote controller 19R corresponding to a channel switch can be identified. Alternatively, when the reception device 12 receives an unidentifiable command from the remote controller 19R, the reception device may set to first assume that a channel switch is detected, extract fingerprint information from a displayed cable television program, and transmit the information to the ACR server 13. Accordingly, because the reception device 12 can acquire an identification result from the ACR server 13, the reception device compares channel identification information pieces before and after the assumed detection of the channel switch, and thereby can determine whether or not the channel has been switched properly. In other words, when the channel is switched properly, the reception devices 12 come to learn that the unidentifiable command from the remote controller 19R is a command corresponding to a channel switch. From the learning of the command, when the reception device 12 receives the next command from the remote controller 19R, the reception device can identify that the command is a command corresponding to a channel switch.

Switch of a channel can be detected using the detection methods described above, however, the detection methods described above are examples, and switch of a channel of a program may set to be detected using other methods by which switch of a channel can be detected.

Returning to FIG. 3, when switch of the channel is detected, the reception device 12 extracts fingerprint information from the video signal and the audio signal of the program being viewed after the switch of the channel (S25), and transmits the information to the ACR server 13 (S26). Then, the ACR server 13 performs the ACR identification process in which the fingerprint information from the reception device 12 is compared with the FP database 13B, and thereby the program being selected by the reception device 12 is identified (S27). The ACR identification process is as described in FIG. 4 above. Then, the ACR server 13 transmits an identification result of the ACR identification process to the reception device 12 that is the source of the inquiry (S28). Note that the processes of Steps S25 to S28 correspond to the processes of Steps S12 to S15 described above.

Then, the reception device 12 compares channel identification information obtained before the detection of the switch of the channel with channel identification information obtained after the detection of the switch of the channel based on the identification result from the ACR server 13 (S29). When the channel identification information pieces before and after the detection of the switch of the channel are different from each other, the channel has been switched properly, and thus the reception device 12 forcedly closes the executed data broadcasting app (S30). Accordingly, in the program after the switch of the channel, the displayed data broadcasting app superimposed on the program before the switch of the channel is not displayed. Here, when it takes time to perform the processes of Steps S25 to S29, or when the detection of the switch of the channel in Step S24 is regarded as being reliable, the data broadcasting app may be closed immediately before Step S24. Even in such a case, the switch of the channel is confirmed by performing the processes of Steps S25 to S29 after the closing.

The above description is of the associated operation of the devices, and the association operation with transitions of a video displayed on the display 32 during the associated operation will be illustrated as FIG. 7. Note that processes performed by the ACR server 13, the command server 14, and the app server 15 for the reception device 12 can be provided as services using so-called cloud computing. Thus, FIG. 7 illustrates the services provided by the ACR server 13, the command server 14, and the app server 15 respectively as an ACR identification service, a command provision service, and an app provision service.

As illustrated in FIG. 7, when the reception device 12 selects a channel A (CH-A), a video P1 of a program CH-A is displayed on the display 32. Then, the reception device 12 periodically extracts fingerprint information (a feature value) from a video signal and an audio signal of the selected program CH-A (S12-1), and then transmits the information to the ACR server 13 (S13-1). On the other hand, the ACR server 13 identifies the selected program CH-A of the reception device 12 by executing the ACR identification service, and then provides an identification result to the reception device 12.

According to the identification result from the ACR server 13, the reception device 12 accesses the command server 14 and inquires of a command that can be executed in the reception device 12. On the other hand, the command server 14 provides the reception device 12 with the command in response to the inquiry from the reception device 12 by executing the command provision service. In addition, when the command from the command server 14 is a command for instructing acquisition or registration of a data broadcasting app (a registration command to be described later), the reception device 12 accesses the app server 15, and requests a data broadcasting app (S19-1). On the other hand, the app server 15 provides the reception device 12 with a data broadcasting app in response to the request from the reception device 12 by executing the app provision service. The reception device 12 registers the data broadcasting app acquired from the app server 15 (S19-1).

In addition, when the command from the command server 14 is a command for instructing acquisition or activation of a data broadcasting app (an execution command to be described later), the reception device 12 activates the acquired data broadcasting app (S19-2). Accordingly, a video P2 in which the data broadcasting app CH-A that indicates program-relevant information about the program CH-A is superimposed on the program CH-A is displayed on the display 32. Thereafter, extraction and transmission of fingerprint information are continuously executed in the reception device 12 (S12-2, . . . , S13-2, . . . ), and commands are acquired from the command server 14 according to identification results from the ACR server 13. Then, the reception device 12 controls operations of the data broadcasting app CH-A according to the acquired commands (S19-3).

Here, when the selected channel A (CH-A) is switched to a channel B (CH-B), the reception device 12 detects the switch of the channel using, for example, a detection method among the first detection method to the fourth detection method described above (S24). Then, the reception device 12 extracts fingerprint information from a video signal and an audio signal of a program being viewed after the detection of the switch of the channel (S25), transmits the information to the ACR server 13 (S26), and thereby acquires an identification result of the ACR identification service.

The reception device 12 compares channel identification information pieces of the program being viewed before and after the detection of the switch of the channel, and when the channel identification information pieces of the program are different from each other, the channel has been switched properly, and thus the reception device forcedly closes the executed data broadcasting app CH-A. In this case, only a video P3 of a program CH-B after the detection of the switch of the channel is displayed on the display 32. On the other hand, when the channel identification information pieces of the program before and after the detection of the switch of the channel are the same, the channel has not been switched for some reason, for example, in erroneous detection or the like, and thus the data broadcasting app CH-A is continuously executed. In this case, the video P2 in which the data broadcasting app CH-A is superimposed on the program CH-A is displayed on the display 32 without change as before the detection of the switch of the channel.

In other words, when the channel is switched properly, the data broadcasting app executed in linkage with the program before the detection of the switch of the channel is forcedly closed, and only the program after the switch of the channel is displayed. Accordingly, it is possible to prevent the data broadcasting app for the selected program before the switch of the channel from being continuously displayed without change after the channel is switched.

Note that, if a switch of a channel is not detected at the time of switching of a channel, the data broadcasting app CH-A is executed as it is even though the channel A (CH-A) is switched to the channel B (CH-B) as illustrated in FIG. 8. For this reason, a video P4 in which the data broadcasting app CH-A is superimposed on the program CH-B is displayed on the display 32. In other words, the data broadcasting app CH-A is continuously executed until fingerprint information is periodically executed and a command for closing the executed data broadcasting app (a termination command to be described later) is acquired, and thus displayed superimposed on the program CH-B.

In this case, even though the program CH-B is displayed due to the switch of the channel, the data broadcasting app CH-A for the program CH-A, which is not related to the program CH-B, is displayed, which for example, is not only against the intention of a producer of the program and the like, but also confuses viewers. Therefore, the present technology is designed such that a switch of a channel is detected at the time of switching of a channel, and when the switch of a channel is performed properly, a data broadcasting app is forcedly closed as illustrated in FIG. 7.

As described above, with the associated operation of devices constituting the broadcasting system 1, a data broadcasting app can be provided to the reception device 12 according to an identification result obtained in the ACR identification process performed on a program being viewed. In addition, when a channel of a program being viewed is switched, the reception device 12 forcedly closes a data broadcasting app, and thus when the channel is switched, the program and the data broadcasting app can be synchronized.

[Details of Commands]

Next, commands provided by the command server 14 will be described in detail with reference to FIGS. 9 to 12. FIG. 9 shows an example of items of information included in a command.

"Command ID" is information for identifying a corresponding command. When a command having the same content is transmitted a plurality of times, the command ID of each command is the same.

"Command effectuation time" is designated with any one of an "absolute date and time," a "relative time," or a "PTS" indicating a time at which a corresponding command is executed. The "absolute date and time" is irrelevant to progress of a program, and designated when a command is executed when a specific date and time set in advance arrives. In addition, the "relative time" is designated when a command is executed after a specific time elapses from a reference time during a program. As the relative time, for example, a time that elapses relatively to the start time of a program is designated. In addition, the "PTS" is designated when a command is executed using a PTS (Presentation Time Stamp) that is time information for performing synchronized reproduction. In other words, as the command effectuation time, a method of designating a time with an STC (System Time Clock) value of a TS can be adopted in addition to the method of designating a time in hours, minutes, and seconds.

Note that when the command effectuation time has already elapsed, a corresponding command is immediately executed at the time of reception.

For a "command target device type", a device that is a target of controlling a data broadcasting application using the command is designated. Here, in addition to the main body of a reception device (reception device 12), when an external device is connected to the reception device 12, the external device is designated as a target device of the command.

"Command action" indicates that a corresponding command is any one of "app acquisition (Register)," "app activation (Execute)," "app closing (Terminate)," "event triggering (Inject_event)," and "app stopping (Suspend)."

A registration (Register) command is a command for instructing acquisition or registration of a data broadcasting application to the reception device 12. Here, registration of a data broadcasting application means storing priority and the expiration date of the application in association with the acquired data broadcasting application. The data broadcasting application is managed according to the priority and the expiration date by the control unit 64.

An execution (Execute) command is a command for instructing acquisition or activation of a data broadcasting application to the reception device 12.

A termination (Terminate) command is a command for instructing the reception device 12 to terminate the executed data broadcasting application.

An inject event (Inject_event) command is a command for causing the reception device 12 to trigger an event in the executed data broadcasting application.

A suspension (Suspend) command is a command for instructing a pause of the executed data broadcasting application to the reception device 12.

"Command application distribution parameter" is a parameter for stochastically distributing a timing at which a corresponding command is applied to a target device such as the reception device 12 or the like. Since a timing at which access is made to the command server 14 and the app server 15 is adjusted with the parameter, accesses to the servers are distributed, and thus loads can be reduced.

"App ID" is identification information of a data broadcasting app with regard to a corresponding command. "Type of app" is information indicating the type of a data broadcasting app with regard to a corresponding command. "Service provider ID" is identification information of a service provider (for example, a broadcasting station or the like) who provides an execution service of a data broadcasting app with regard to a corresponding command.

"App URL" is information indicating the URL of an acquisition source of a data broadcasting app when the command action is "app acquisition" or "app activation." "App expiration date" is information indicating the date of expiration of a data broadcasting app. In addition, "app holding priority" is information indicating priority of a data broadcasting app to be acquired and held with regard to a corresponding command. When a data broadcasting app is registered, the app expiration date and holding priority of the data broadcasting app are stored, and the data broadcasting app is managed according to the expiration date and priority.

"Event ID" is identification information of an event to be triggered in a data broadcasting app designated with an app ID when the command action is "event triggering." In addition, in "event addition data," data referred to in order to trigger an event when the command action is "event triggering" is stored.

Here, detailed specifications of a command are shown in FIGS. 10 and 11.

Command elements mainly include, in addition to a destination attribute and an action attribute, a timing element, a diffusion element, an application element, and an event element.

The destination attribute corresponds to the "command target device type" of FIG. 9. With regard to the destination attribute, when the reception device 12 is set as the command target device, for example, "receiver" is designated, and when an external device is set as the command target device, "external 1" or "external 2" is designated.

The action attribute corresponds to the "command action" of FIG. 9. With regard to the action attribute, when acquisition or activation of a data broadcasting application is instructed, for example, "execute" is designated, when acquisition or registration of the data broadcasting app is instructed, "register" is designated, and when stop of the data broadcasting app is instructed, "suspend" is designated. In addition, with regard to the action attribute, when closing of the data broadcasting app is instructed, "terminate" is designated, and when an event is ignited in the data broadcasting app being executed, "event" is designated.

The timing element corresponds to the "command effectuation time" of FIG. 9. As an attribute of the timing element, there is a unit attribute. When "absolute date and time" is used for the unit attribute, for example, "utc" is designated, when "relative time" is used, "smpte" is designated, and when "PTS" is used, "pts" is designated.

The diffusion element corresponds to the "command application distribution parameter" of FIG. 9. As an attribute of the diffusion element, there are a rate attribute, a range attribute, and a period attribute, and the number of divisions, a maximum delay time, and a command application diffusion period are designated.

The application element corresponds to the "app ID," "type of app," "app URL," "app holding priority," and "app expiration date" of FIG. 9, and an id attribute, a type attribute, a url attribute, a priority attribute, and an expire date attribute are designated. The url attribute and expire date attribute are essential items when the action attribute is "execute" or "register." In addition, for the priority attribute, "0" is generally designated, and when priority is to be raised, "1" is designated.

The event element corresponds to the "event ID" and "event addition data" of FIG. 9, and an id attribute and a data attribute are designated. The event element is essential item when the action attribute is "event."

[Description Example of a Command]

FIG. 12 is a diagram showing a description example of a command.

In the example of FIG. 12, in the command element, "receiver" is designated for the destination attribute, and "execute" is designated for the action attribute. In other words, the corresponding command is an execution command destined for the reception device 12.

The timing element and the application element are described between the start tag and the end tag of the command element.

In the timing element, "pts" is designated for the unit attribute, and 1286743" is designated for a value thereof. In other words, the command is executed when a clock of "1286743" elapses.

In the application element, "1" is designated for the id attribute, and "html" for the type attribute, "xxx.com/yyy" for the url attribute, and "2011-01-21" for the expire date attribute. In other words, the description means that a data broadcasting app described in HTML (Hyper Text Markup Language) can be acquired from the app server 15 designated in the URL of "xxx.com/yyy."

Note that a command description method is arbitrary, and is not limited to the example of FIG. 12.

[State Transition of a Data Broadcasting Application]

Figure 13:
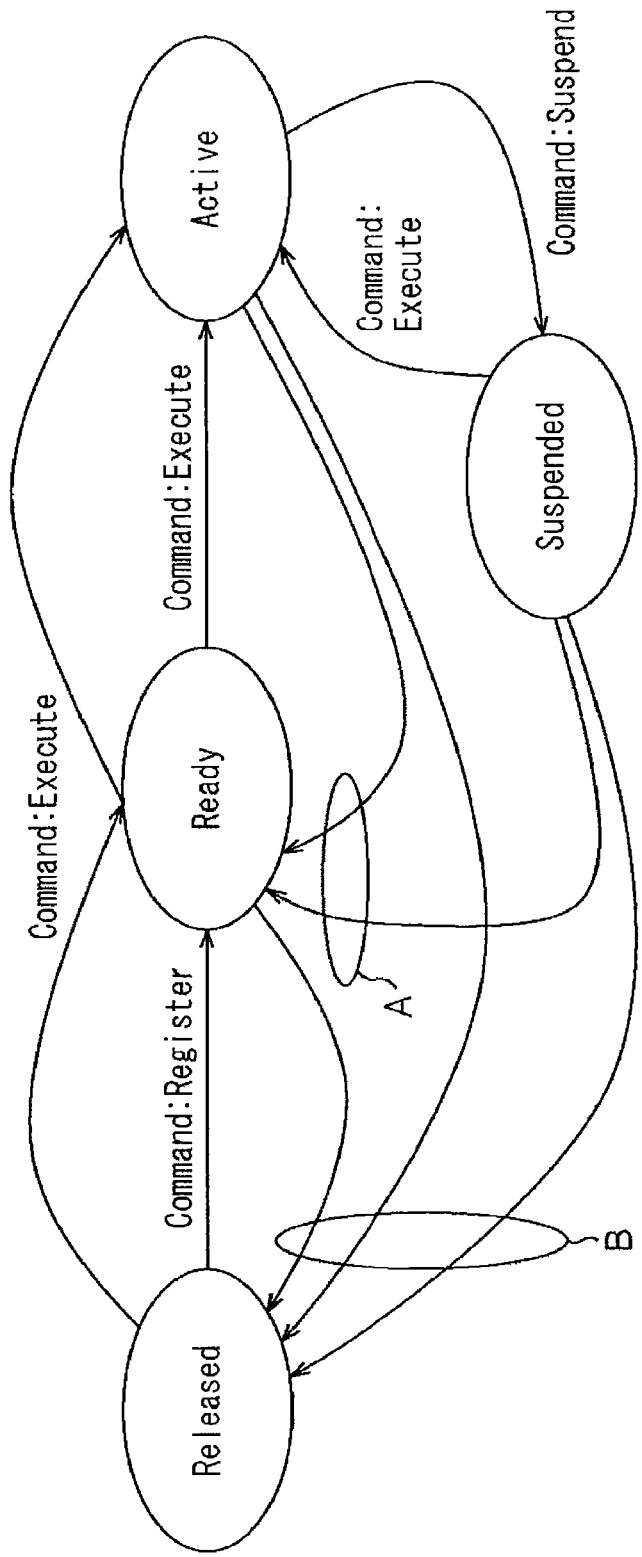
FIG. 13 is a diagram illustrating state transition of an application.

FIG. 13 is a diagram illustrating state transition of a data broadcasting application that is operated by the reception device 12 according to each command for registration, execution, event, inject event, and termination. As illustrated in the drawing, a state of the data broadcasting application is defined to transition to any of four states of a released state (Released), a ready state (Ready), an active state (Active), and a paused state (Suspended).

The released state refers to a state in which the data broadcasting application is not acquired by the reception device 12. The ready state refers to a state in which the data broadcasting application is registered in the reception device 12 but not yet activated. The active state refers to a state in which the data broadcasting application is activated and being executed. The paused state refers to a state in which the execution of the data broadcasting application is stopped and information indicating the state of the application when stopped is retained in the save memory 69B.

When a state of the data broadcasting application is transitioned to the released state (when the application is not acquired by the reception device 12), if the registration command is received and the data broadcasting application is acquired (registered) according to the registration command, the state is transitioned to the ready state.

When the data broadcasting application is in the ready state, if the execution command is received and the data broadcasting application is activated according to the execution command, the state is transitioned to the active state.

In addition, when the state of the data broadcasting application is transitioned to the released state (when the application is not acquired by the reception device 12), if the execution command is received and the data broadcasting application is acquired and activated according to the execution command, the state is transitioned to the active state.

When the state of the data broadcasting application is transitioned to the active state, if the suspension command is received and the executed data broadcasting application is stopped according to the suspension command, the state is transitioned to the suspended state.

When the state of the data broadcasting application is transitioned to the suspended state, if the execution command is received and the stopped data broadcasting application resumes according to the execution command, the state is transitioned to the active state.

When the state of the data broadcasting application is transitioned to the active state or the suspended state, if the termination command is received and the executed data broadcasting application is closed according to the termination command, the state is transitioned to the ready state ("A" in the drawing). Note that transition to the ready state occurs not only when the transition is executed based on the termination command but also when another data broadcasting application is executed.

In addition, when the data broadcasting application is transitioned to the ready state, the active state, or the suspended state and the application expiration date of the command passes, the application is transitioned to the ready state ("B" in the drawing).

Figure 14:
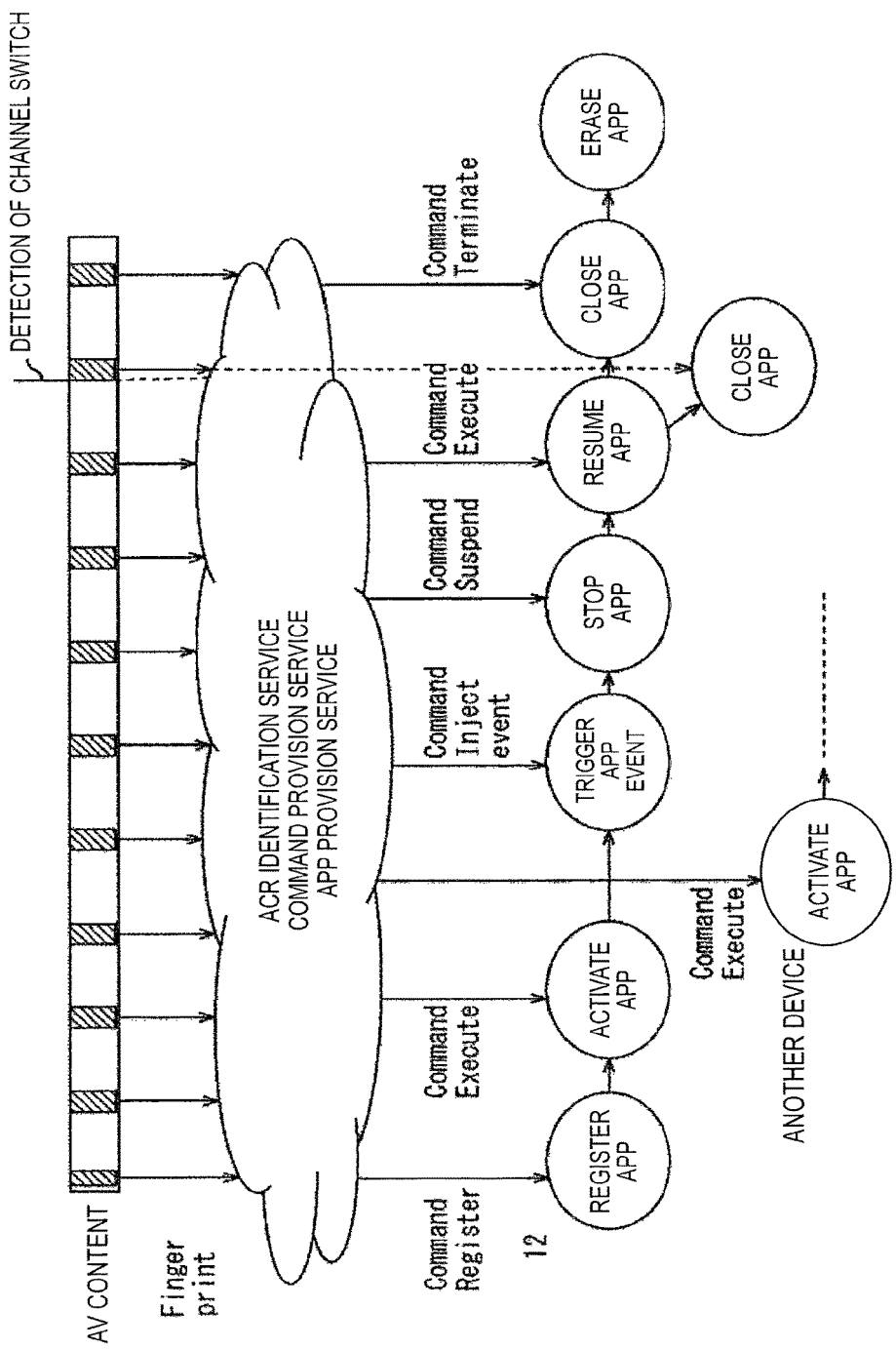
FIG. 14 is a diagram illustrating the relationship between each command and state transition.

FIG. 14 illustrates a relationship between each command and state transition.

FIG. 14 schematically illustrates a state in which the reception device 12 transmits fingerprint information extracted from data of AV content such as a program or a commercial to the ACR server 13 and various commands and a data broadcasting app are respectively acquired from the command server 14 and from the app server 15. Note that, in FIG. 14, the ACR server 13, the command server 14, and the app server 15 are assumed to respectively provide the ACR identification service, the command provision service, and the app provision service as in FIGS. 7 and 8.

When a data broadcasting app is transitioned to a release state in the reception device 12 (in a case of non-acquisition in the reception device 12), the data broadcasting app is transitioned to a preparation state as the app is acquired, held, and registered according to the registration command.

When the data broadcasting app is in the preparation state in the reception device 12, the data broadcasting app is transitioned to an executing state as the app is activated according to the execution command.

In addition, when a data broadcasting app is in a release state in a device other than the reception device 12 (in a case of non-acquisition in another device), the data broadcasting app is transitioned to the executing state as the app is acquired and activated according to the execution command.

When the data broadcasting app is in the executing state in the reception device 12 and an event is triggered in the executed data broadcasting app according to the Inject_event command, the state is maintained in the executing state.

When the data broadcasting app is transitioned to the executing state in the reception device 12, the executed data broadcasting app is transitioned to a pause state as it stops according to the suspension command. In addition, when the data broadcasting app is transitioned to the pause state in the reception device 12, the stopped data broadcasting app is transitioned to the executing state as it resumes according to the execution command.

Here, when the data broadcasting app is transitioned to the executing state in the reception device 12, the executed data broadcasting app is forcedly closed and transitioned to the preparation state as switching of a channel is detected.

In addition, when the data broadcasting app is transitioned to the executing state in the reception device 12, the executed data broadcasting app is transitioned to the preparation state as the app is closed according to the termination command. Note that when the data broadcasting app is transitioned to the preparation state, the executing state, or the pause state and the app expiration date of the data broadcasting app passes, the data broadcasting app is erased from the cache memory 68, the registration is cancelled, and then the app is transitioned to the release state.

[Command Response Process According to an ACR Identification Result]

Next, a command response process when the reception device 12 receives a command according to an identification result obtained from the ACR identification process (hereinafter referred to as a command response process according to an ACR identification result) will be described with reference to FIGS. 15 and 16.

Figure 15:
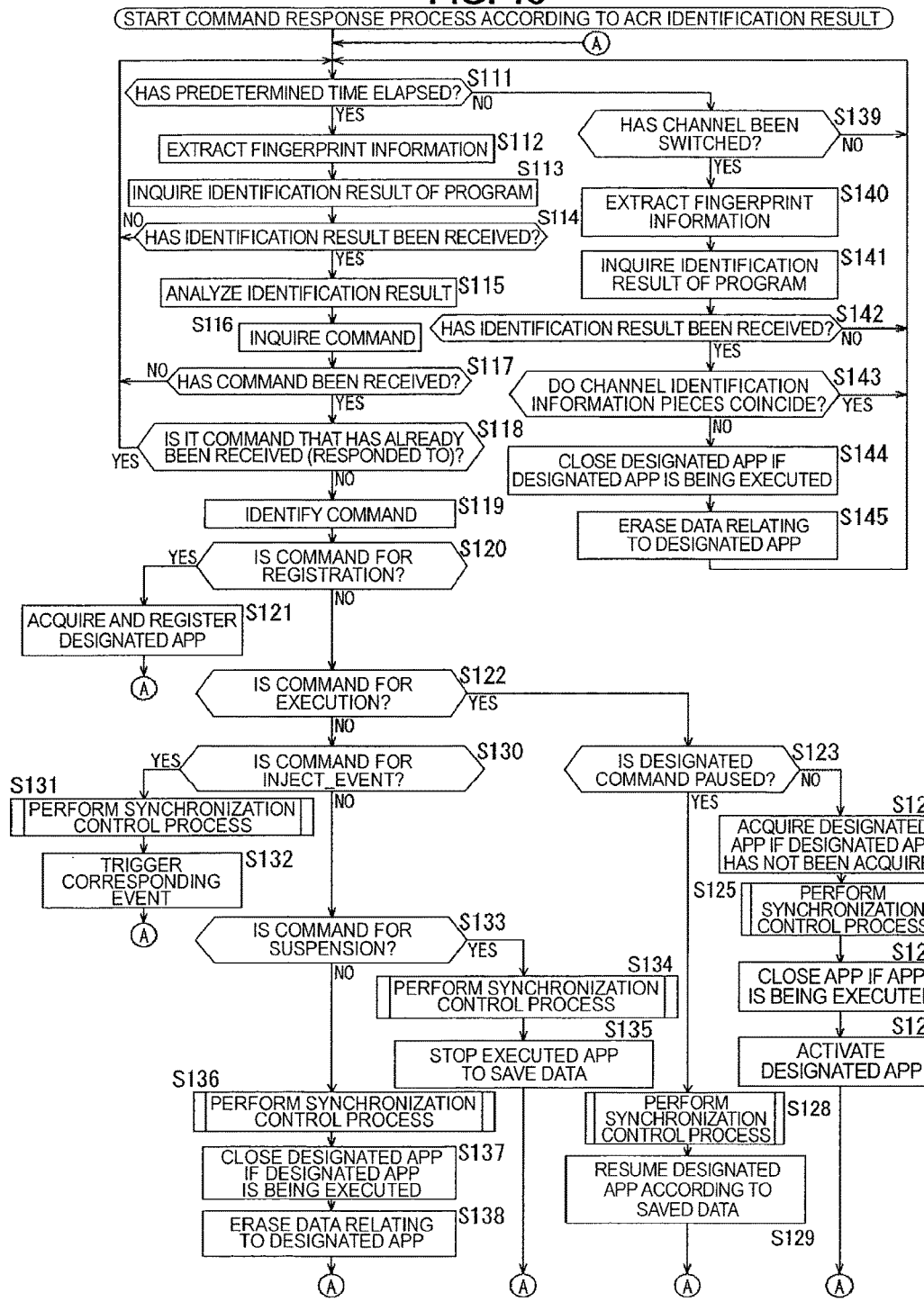
FIG. 15 is a flowchart for describing a command response process according to an ACR identification result.

FIG. 15 is a flowchart describing the command response process according to an ACR identification result. The command response process according to an ACR identification result is repeatedly executed while a user views a program, in other words, the reception device 12 receives a digital television broadcast signal from a broadcasting device 11, or receives a cable television broadcast signal from the CATV device 17 via the set-top box 19.

The fingerprint extraction unit 60 determines whether or not a predetermined time has elapsed in Step S111, and extracts fingerprint information from a video signal and an audio signal of the program after waiting for the elapse of the predetermined time (Step S112). In other words, the fingerprint extraction unit 60 periodically extracts fingerprint information at predetermined intervals of, for example, several seconds or the like.

In Step S113, the fingerprint extraction unit 60 controls the communication I/F 61 such that the extracted fingerprint information is transmitted to the ACR server 13 via the Internet 16 to inquire an identification result of the selected program. The ACR server 13 performs the ACR identification process based on the fingerprint information and then transmits an identification result to the reception device 12. Note that when an identification result of the program is not obtained in the ACR server 13, transmission of an identification result is not performed.

In Step S114, the control unit 64 controls the communication I/F 61 to determine whether or not the identification result has been received from the ACR server 13 that is a destination of the inquiry of the identification result.

When the identification result is determined not to have been received in Step S114, the process returns to Step S111, and the process and the succeeding processes are repeated. When a channel of which broadcasting is paused is selected in the reception device 12 and fingerprint information thereof is extracted, for example, the ACR server 13 is not capable of identifying the program, and thus an identification result is not transmitted (it may be possible to transmit an identification result which indicates "not applicable").

On the other hand, when the identification result is determined to have been received in Step S114, the process proceeds to Step S115. In Step S115, the control unit 64 analyzes the identification result of the selected program received by the communication I/F 61. Here, as the identification result, channel identification information, time position information, and command acquisition source information of the selected program are obtained. In addition, the control unit 64 stores the channel identification information of the selected program in the memory 65.

In Step S116, the control unit 64 controls the communication I/F 61 to access the command server 14 corresponding to the URL indicated by the command acquisition source information, and transmits the channel identification information and the time position information to inquire a command that can be executed in the reception device 12. In the command server 14, a command that can be executed in a time zone corresponding to the time position information in the program corresponding to the channel identification information is acquired, and transmitted to the reception device 12.

In Step S117, the control unit 64 controls the communication I/F 61 to determine whether or not the command has been received from the command server 14 that is a destination to inquire the command inquiry.

When the command is determined not to have been received in Step S117, the process returns to Step S111, and the process and the succeeding processes are repeated. When, for example, there is no command that does not meet conditions decided based on the channel identification information and the time position information, the command server 14 does not transmit a command (it may be possible to transmit a command which indicates "process unnecessary").

On the other hand, when the command is determined to have been received in Step S117, the process proceeds to Step S118. In Step S118, the command analysis unit 62 reads the command ID included in the command, and determines whether or not the process of Step S119 and the succeeding processes have been executed on the command. When the process of Step S119 and the succeeding processes are determined to have already been executed, the process returns to Step S111, and the step and the succeeding processes are repeated. On the other hand, when the process of Step S119 and the succeeding processes are determined not to have been executed on the command, the process proceeds to Step S119.

In Step S119, the command analysis unit 62 reads a command action included in the command, and determines whether the command is of registration, execution, termination, Inject_event, or suspension.

In Step S120, the command analysis unit 62 determines whether or not the determination result of Step S119 is for registration, and when it is determined to be for registration, the process proceeds to Step S121.

In Step S121, the control unit 64 controls the communication I/F 61 to access the application server 15 corresponding to an application URL of the command, and then to acquire a data broadcasting application specified by an application ID. The data broadcasting application acquired using the communication I/F 61 is retained in the cache memory 68. In addition, the control unit 64 causes the application expiration date and the application retaining priority to be stored in the memory 65 in association with the acquired data broadcasting application. Accordingly, the data broadcasting application retained in the cache memory 68 is managed by the control unit 64 according to the expiration date and the retaining priority.

Then, the process returns to Step S111, and the process and the succeeding processes are repeated.

When the determination result of Step S120 is determined not to be for registration in Step S119, the process proceeds to Step S122. In Step S122, the control unit 64 determines whether or not the determination result of Step S119 is for execution, and when it is determined to be for execution, the process proceeds to Step S123.

In Step S123, the application engine 67 determines whether or not the data broadcasting application specified by the command ID of the command is paused (in the suspended state) according to the control of the control unit 64. To be specific, the application is determined to be paused when data indicating the paused state in the data broadcasting application specified by the command ID is saved in the save memory 69B.

In Step S123, when it is determined that the data broadcasting application specified by the command ID is not in pause, the process proceeds to Step S124. In Step S124, the application engine 67 acquires the data broadcasting application specified by the command ID according to the control of the control unit 64 when the application is not acquired (not present in the cache memory 68).

In Step S125, the control unit 64 performs a synchronization control process. Herein, details of the synchronization control process will be described with reference to the flowchart of FIG. 16.

In Step S151, the control unit 64 determines whether or not a command effectuation time included in the command is set.

When the command effectuation time is determined to have been set in Step S151, the process proceeds to Step S152. In Step S152, the control unit 64 determines whether or not the time to execute the command has arrived.

The command effectuation time is designated with, for example, an absolute date and time, a relative time, or a PTS. In the determination process of Step S152, it is determined whether or not a specific date and time set in advance has arrived when the absolute date and time is designated. In addition, when the relative time is designated, for example, it is determined whether or not a specific time set in advance has elapsed from the start time of the program. Furthermore, when a PTS is designated, it is determined whether or not the time to execute the command has arrived based on a clock from the clock synchronization unit 63.

In the determination process of Step S152, the determination process is repeated until the time to execute command is determined to have arrived. In other words, the execution of the command is awaited until the time to execute the command arrives.

Then, when the time to execute the command is determined to have arrived in Step S152, the process returns to Step S125 of FIG. 15, and the process and the succeeding processes are executed.

In Step S126, if there is a data broadcasting app currently being executed, the app engine 67 closes the app according to control of the control unit 64. Then, in Step S127, the app engine 67 activates a data broadcasting app specified by a command ID according to control of the control unit 64.

In other words, since the data broadcasting app is activated after the time to execute the command elapses by performing the synchronization control process (of FIG. 16) of Step S125, it is possible to activate the data broadcasting app, for example, in accordance with progress of the program or in a specific time zone.

Figure 16:
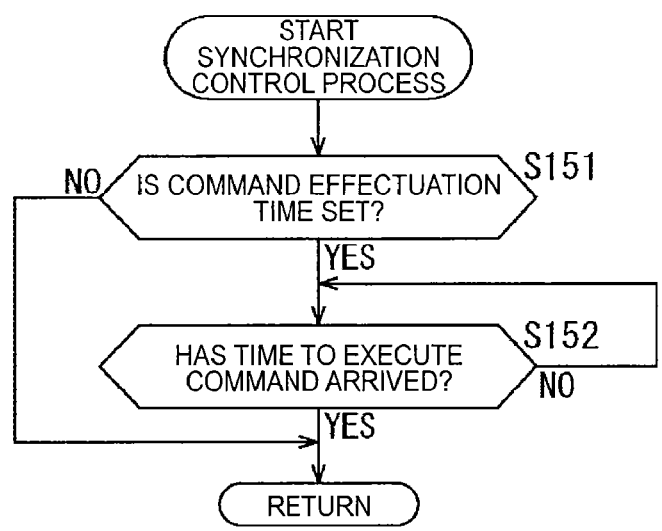
FIG. 16 is a flowchart for describing a synchronization control process.

In addition, when the command effectuation time is not set ("No" in Step S151 of FIG. 16), Step S152 of FIG. 16 is skipped, the acquisition process of Step S124 ends, and then Steps S126 and 127 are immediately executed. In this case, after a data broadcasting app that has not been acquired is acquired, the data broadcasting app is activated.

Then, the process returns to Step S111, and the process and the succeeding processes are repeated.

In addition, in Step S123, when the data broadcasting app specified by the command ID is determined to be in pause (a suspended state), the process proceeds to Step S128.

In Step S128, the control unit 64 performs the synchronization control process of FIG. 16. In other words, when the command effectuation time is set, the process of Step S129 is performed when the time to execute the command arrives, and when the command effectuation time is not set, the process of Step S129 is immediately performed.

In Step S129, the app engine 67 transfers the data of the save memory 69B to the work memory 69A according to control of the control unit 64 thereby activating the data broadcasting app specified by the command ID. Accordingly, the paused data broadcasting app specified by the command ID resumes from the paused state. Then, the process returns to Step S111, and the process and the succeeding processes are repeated.

In Step S122, when the determination result of Step S119 is determined not to be of execution, the process proceeds to Step S130. In Step S130, the control unit 64 determines whether or not the determination result of Step S119 is of Inject_event, and when the determination result is determined to be Inject_event, the process proceeds to Step S131.

In Step S131, the control unit 64 performs the synchronization control process of FIG. 16. In other words, when the command effectuation time is set, the process of Step S132 is performed when the time to execute the command arrives, and when the command effectuation time is not set, the process of Step S132 is immediately performed.

In Step S132, only when the command ID of the command coincides with the command ID of the operating data broadcasting app, the control unit 64 controls the app engine 67 to trigger (execute) an event corresponding to the command ID of the command in the operating data broadcasting app. Then, the process returns to Step S111, and the process and the succeeding processes are repeated.

In Step S130, when the determination result of Step S119 is determined not to be of Inject_event, the process proceeds to Step S133. In Step S133, the control unit 64 determines whether or not the determination result of Step S119 is of suspension, and when the determination result is determined to be of suspension, the process proceeds to Step S134.

In Step S134, the control unit 64 performs the synchronization control process of FIG. 16. In other words, when the command effectuation time is set, the process of Step S135 is performed when the time to execute the command arrives, and when the command effectuation time is not set, the process of Step S135 is immediately performed.

In Step S135, the app engine 67 saves data indicating a state of the data broadcasting app currently being executed (in other words, data currently written in the work memory 69A; when displayed information has a hierarchical structure, the data includes information indicating hierarchies of the displayed information) in the save memory 69B according to the control of the control unit 64. Then, the process returns to Step S111, and the process and the succeeding processes are repeated.

In Step S133, when the determination result of Step S119 is determined not to be of suspension, the determination result of Step S119 is of termination, and thus the process proceeds to Step S136.

In Step S136, the control unit 64 performs the synchronization control process of FIG. 16. In other words, when the command effectuation time is set, the process of Step S137 is performed when the time to execute the command arrives, and when the command effectuation time is not set, the process of Step S137 is immediately performed.

In Step S137, when the data broadcasting application specified by the command ID is in execution, the application engine 67 closes the application according to the control of the control unit 64. In Step S138, the application engine 67 erases data relating to the data broadcasting application specified by the command ID from the work memory 69A and the save memory 69B and erases the data broadcasting application from the cache memory 68 according to the control of the control unit 64. Then, the process returns to Step S111, and the process and the succeeding processes are repeated.

In addition, in Step S111, when it is determined not to be the time to periodically extract the fingerprint information, the process proceeds to Step S139. In Step S139, the channel switch detection unit 70 performs detection of switching of a channel, and determines whether or not a channel has been switched. In Step S139, when a channel is determined not to have been switched, the process returns to Step S111, and the process and the succeeding process are repeated.

On the other hand, in Step S139, when a channel is determined to have been switched, the process proceeds to Step S140. In Steps S140 to S142, the fingerprint extraction unit 60 extracts fingerprint information from a video signal and an audio signal of the program and then transmits the information to the ACR server 13 as in Steps S112 to S114. Then, when the communication I/F 61 receives an identification result from the ACR server 13, the process proceeds to Step S143. As a pre-process of the determination process of Step S143, the control unit 64 acquires channel identification information of a program to be viewed after the detection of switching of the channel obtained from the identification result from the communication I/F 61, and reads from the memory 65 channel identification information of the program that has been viewed before the detection of switching of the channel.

Then, the control unit 64 compares channel identification information pieces of the program before and after the detection of switching of the channel in Step S143 to determine whether or not the channel identification information pieces coincide with each other.

In Step S143, when the channel identification information pieces are determined to be different from each other, the channel has been switched properly, and thus the process proceeds to Step S144. In Step S144, if the data broadcasting app specified by the command ID is being executed, the app engine 67 closes the app according to control of the control unit 64. In Step S145, the app engine 67 erases data relating to the data broadcasting app specified by the command ID from the work memory 69A and the save memory 69B and erases the data broadcasting app from the cache memory 68 according to control of the control unit 64. Then, the process returns to Step S111, and the process and the succeeding processes are repeated.

Note that, in Step S143, when the channel identification information pieces are determined to coincide with each other, the channel has not been properly switched for some reason, for example, in erroneous detection or the like, and thus the process returns to Step S111 while the processes of Steps S144 and S145 are skipped, and the process and the succeeding processes are repeated.

Hereby, the description of the command response process according to an ACR identification result is finished. According to the command response process according to an ACR identification result described above, a data broadcasting app can be activated, and an event can be triggered and end in linkage with AV content (for example, a program, a commercial, and the like). Furthermore, a data broadcasting app can be paused while maintaining an executing state thereof, another data information app can be executed and closed, and then the paused data broadcasting app can resume from the pause state.

In addition, by performing the command response process according to an ACR identification result, a data broadcasting app executed in linkage with AV content can be provided using the ACR technology. Furthermore, when a channel is switched, an executed data broadcasting app ends, and thus it is possible to prevent display of a data broadcasting app beyond expectation.

In the example of FIG. 15, description is provided such that, in Steps S124 to S127, after the data broadcasting app which has not been acquired is acquired (S124), the acquired data broadcasting app is activated when the time to execute the command arrives (S125), however, order of the processes of Steps S124 and S125 may be reversed. In other words, in this case, the data broadcasting app which has not been acquired is not acquired before the time to execute the command arrives, and the data broadcasting app which has not been acquired is acquired and activated when the time to execute the command arrives.

[Operation Scenario]

Figure 17:
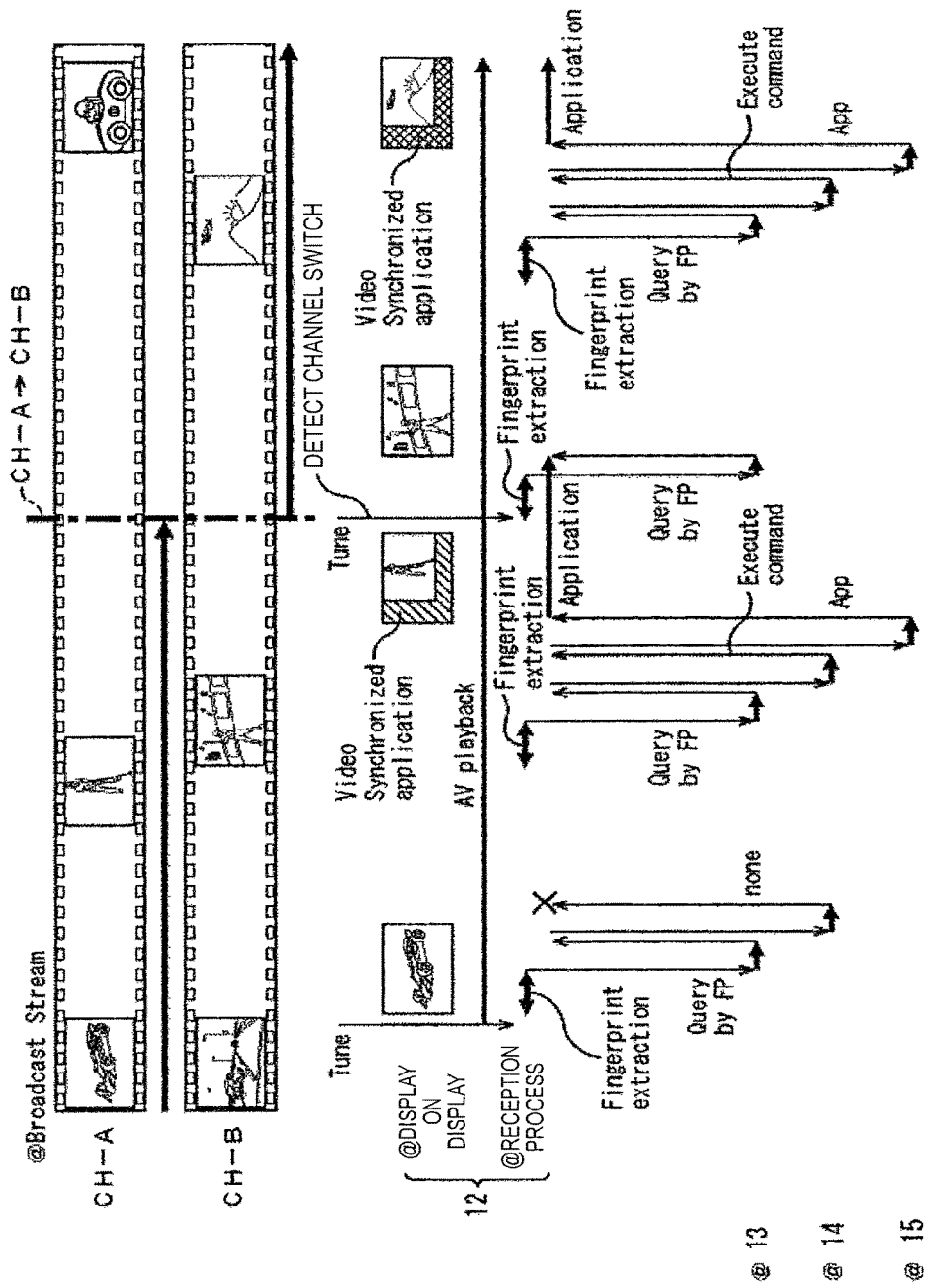
FIG. 17 is a diagram illustrating an example of an operation scenario.
Figure 18:
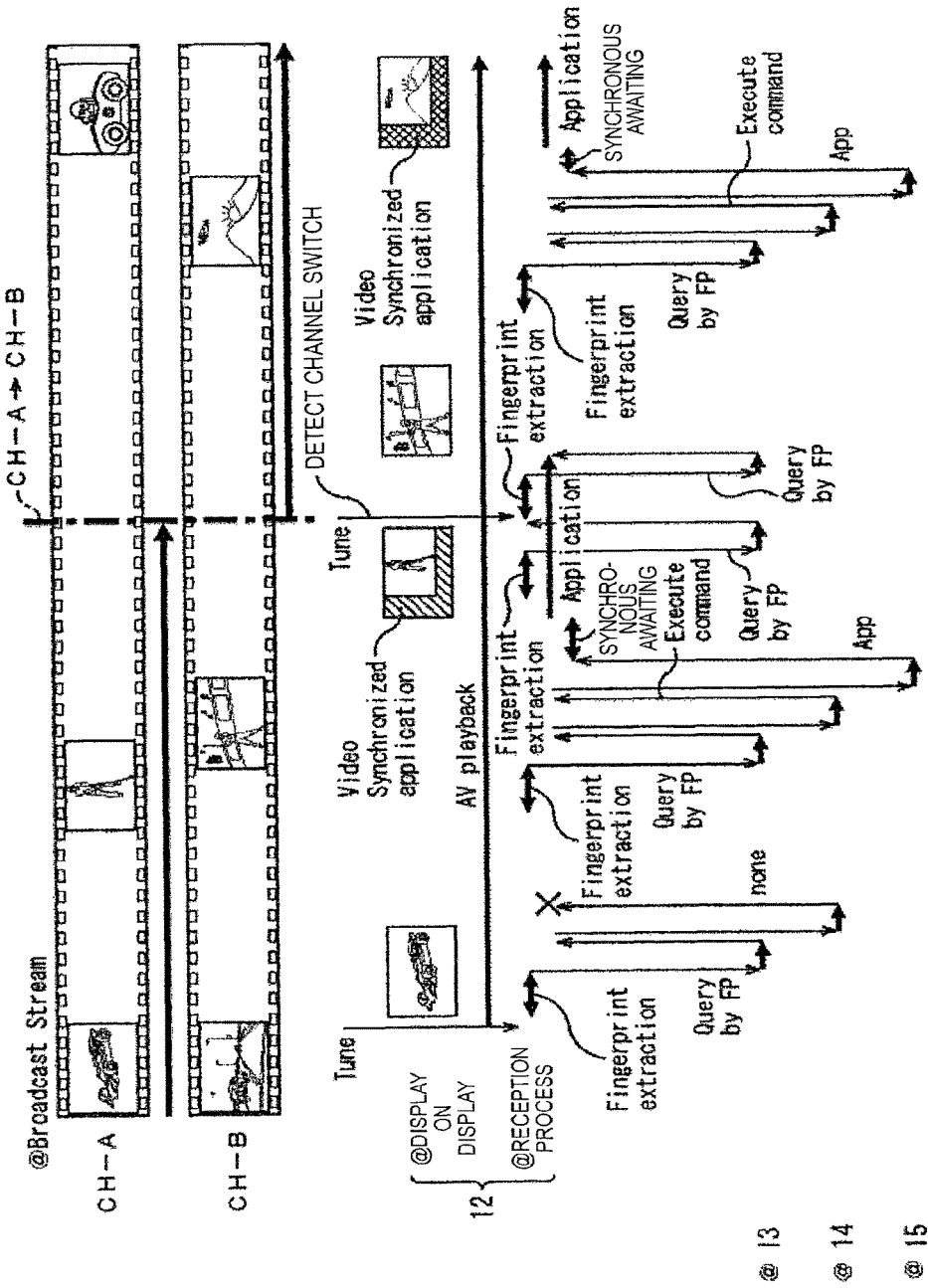
FIG. 18 is a diagram illustrating an example of another operation scenario.

An operation of a data broadcasting app as illustrated in, for example, FIGS. 17 and 18 is possible by performing the command response process according to the ACR identification result of FIG. 15 in the reception device 12.

FIG. 17 is a diagram illustrating an example of an operation scenario when a command effectuation time is not set.

When a program of the channel A (CH-A) corresponding to a digital television broadcast signal or a cable television broadcast signal is displayed on the display 32, the reception device 12 periodically extracts fingerprint information from a video signal and the like of the selected program and transmits the information to the ACR server 13. The ACR server 13 that has received the fingerprint information performs the ACR identification process, and an identification result thereof is transmitted to the reception device 12.

The reception device 12 inquires a command to the command server 14 according to the identification result from the ACR server 13, however, when there is no command that the reception device 12 can execute, no response is transmitted from the command server 14.

Then, the reception device 12 continuously performs periodic extraction of fingerprint information and makes inquiries to the ACR server 13 and the command server 14 corresponding thereto. Then, when the reception device 12 receives an execution command from the command server 14, the reception device accesses the app server 15 corresponding to an app URL, and acquires and executes a data broadcasting app. Accordingly, program-related information ("Video Synchronized application" in the drawing) corresponding to the data broadcasting app for the channel A (CH-A) and the like is displayed superimposed on the program of the channel A (CH-A) that has been displayed on the display 32.

Here, when the selected channel A (CH-A) is switched to the channel B (CH-B), the reception device 12 detects switching of the channel using, for example, any detection method from the first to the fourth detection methods described above. Then, the reception device 12 extracts fingerprint information from a video signal and the audio signal of a program viewed after the switching of the channel, transmits the information to the ACR server 13, and then acquires an identification result of the program. The reception device 12 compares the channel identification information pieces of the programs displayed on the display 32 before and after the detection of the switching of the channel, and when the channel identification information pieces of the programs are different from each other, the channel has been switched properly, and thus the reception device forcedly closes the executed data broadcasting app. Accordingly, the program-related information superimposed and displayed on the program of the channel A (CH-A) is erased, and only the program of the channel B (CH-B) is displayed.

In addition, when the reception device 12 receives the execution command from the command server 14 while the channel B (CH-B) is selected, the reception device accesses the app server 15 corresponding to an app URL, and acquires and executes a data broadcasting app. Accordingly, program-related information ("Video Synchronized application" in the drawing) corresponding to the data broadcasting app for the channel B (CH-B) is displayed superimposed on the program of the channel B (CH-B) that has been displayed on the display 32.

In the example of FIG. 17, the execution command has been described as a command that the reception device 12 receives from the command server 14, however, another command may set to be received. For example, when the Inject_event command is received during execution of the data broadcasting app, an event is ignited in the executed data broadcasting app, and when the suspension command is received, the executed data broadcasting app is paused. In addition, when the termination command is received during the execution of the data broadcasting app, for example, the executed data broadcasting app is closed.

As described above, in the operation scenario of FIG. 17, since a command effectuation time is not set in commands transmitted from the command server 14, the reception device 12 immediately executes a command received from the command server 14. In addition, when a channel is switched in the reception device 12, the executed data broadcasting app is forcedly closed.

FIG. 18 is a diagram illustrating an example of an operation scenario when a command effectuation time is set.

In FIG. 18, when the reception device 12 periodically extracts fingerprint information and receives the execution command from the ACR server 13, the reception device accesses the app server 15 corresponding to an app URL and acquires a data broadcasting app. In addition, since a command effectuation time is set in the execution command, after the data broadcasting app is acquired, execution of the execution command is awaited ("synchronous awaiting" in the drawing) until the time to execute the command arrives. When program-related information corresponding to the data broadcasting app is displayed in synchronization with a specific scene of the program of the channel A (CH-A), for example, the time to be synchronized with the specific command is described in the command effectuation time, and thus the data broadcasting app is activated, awaiting the time at which the command is executed. Accordingly, the specific scene of the program of the channel A (CH-A) and the program-related information ("Video Synchronized application" in the drawing) can be synchronized.

In addition, when the selected channel A (CH-A) is switched to the channel B (CH-B), the reception device 12 detects the switching of the channel and forcedly closes the executed data broadcasting app as in FIG. 17 described above. Accordingly, the program-related information superimposed and displayed on the program of the channel A (CH-A) is erased, and only the program of the channel B (CH-B) is displayed.

When extraction of fingerprint information continues thereafter and the execution command is received from the command server 14, the reception device 12 accesses the app server 15 corresponding to an app URL and acquires a data broadcasting app. In addition, the reception device 12 awaits the time to execute the command and then activates the data broadcasting app. Accordingly, the program-related information ("Video Synchronized application") in the drawing corresponding to the data broadcasting app for the channel B (CH-B) is displayed superimposed on the program of the channel B (CH-B) displayed on the display 32.

In the example of FIG. 18, the execution command has been described as a command that the reception device 12 receives from the command server 14, however, another command may be set to be received. When, for example, the Inject_event command is received during the execution of the data broadcasting app, the time to execute the command is awaited and then an event is ignited in the executed data broadcasting app. In addition, when the suspension command is received during the execution of the data broadcasting app, the time to execute the command is awaited and then the executed data broadcasting app is paused. Furthermore, when the termination command is received during the execution of the data broadcasting app, for example, the time to execute the command is awaited and then the executed data broadcasting app is closed.

As described above, in the operation scenario of FIG. 18, since a command effectuation time is set in a command transmitted from the command server 14, the reception device 12 awaits the time to execute the command, and then executes the command received from the command server 14. Accordingly, the reception device 12 can execute the command at an arbitrary timing, rather than with resolution power of extraction of fingerprint information. In addition, when the reception device 12 detects switching of a channel, an executed data broadcasting app is forcedly closed, and thus the reception device can close the executed data broadcasting app at a timing of channel switching, rather than with resolution power of extraction of fingerprint information.

Second Embodiment

[Configuration Example of Another Broadcasting System]

Figure 19:
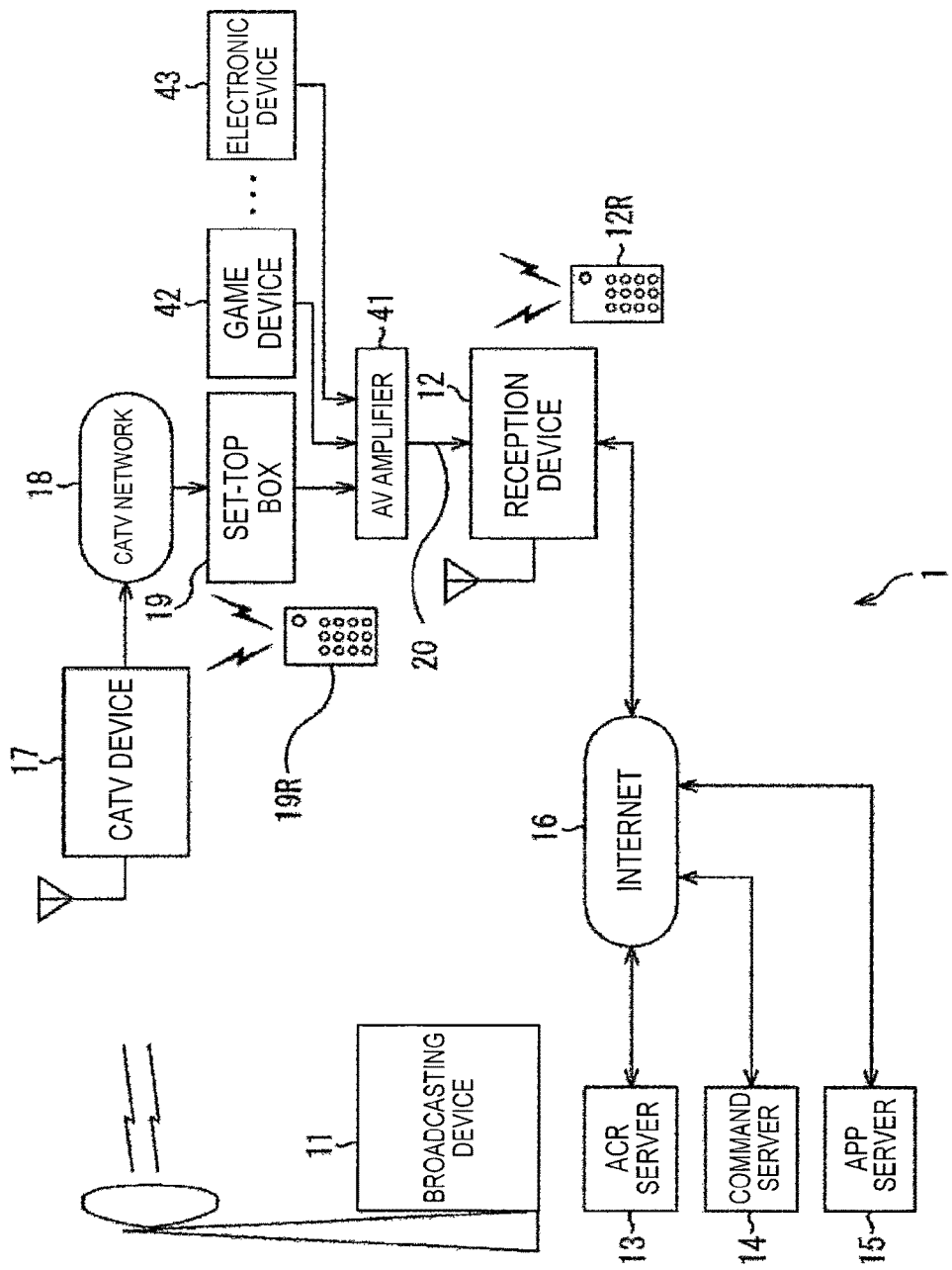
FIG. 19 is a diagram illustrating another configuration example of the broadcasting system.

FIG. 19 illustrates the broadcasting system 1 according to a second embodiment. In the broadcasting system 1, an AV amplifier 41 having a function as an AV selector is connected between the reception device 12 and the set-top box 19 unlike in FIG. 1.

The AV amplifier 41 has input and output units based on an HDMI standard, an electronic device that has an HDMI terminal such as a game device 42 and an electronic device 43 is connected to the input side of the AV amplifier in addition to, for example, the set-top box 19, and the reception device 12 is connected to the output side via the HDMI cable 20. The AV amplifier 41 selects a desired AV content item from a plurality of AV content items input from the plurality of electronic devices connected on the input side thereof, and outputs the AV content to the reception device 12 connected on the output side thereof.

The reception device 12 detects switching of AV content being viewed according to a selection result of the AV content by the AV amplifier 41. When switching of the viewed AV content is detected, the reception device 12 closes a data broadcasting app being executed in linkage with the viewed AV content.

Note that, since other configurations of FIG. 19 are the same as those of the broadcasting system 1 described above in FIG. 1, description thereof will not be repeated.

The broadcasting system 1 of FIG. 19 is configured as described above.

[Another Configuration Example of the Reception Device]

Figure 20:
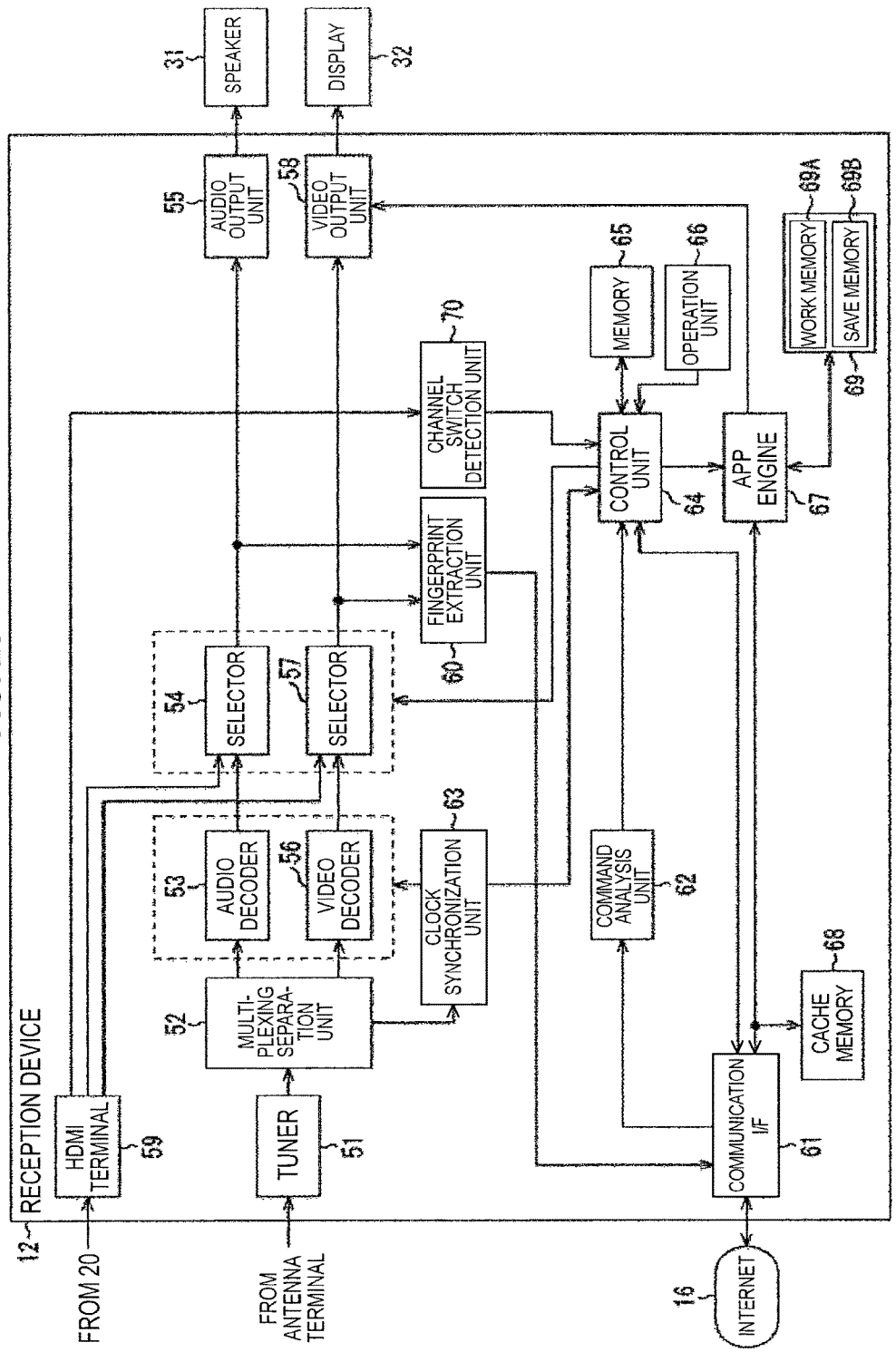
FIG. 20 is a diagram illustrating another configuration example of the reception device.

FIG. 20 illustrates another configuration example of the reception device 12 of FIG. 19. An input to the channel switch detection unit 70 of this reception device 12 is different from that of FIG. 2. In other words, in FIG. 20, only a notification signal from the HDMI terminal 59 is input to the channel switch detection unit 70.

To be specific, when an electronic device selected by the AV amplifier 41 is switched, the HDMI terminal 59 supplies an audio signal and a video signal of AV content input from the electronic device that is a switched source via the HDMI cable respectively to the selector 54 and the selector 57. In addition, the HDMI terminal 59 outputs the notification signal for notifying the switching to the channel switch detection unit 70. In the reception device 12, for example, when an input to the HDMI terminal 59 is switched from AV content from the set-top box 19 to AV content from the game device 42, a clock signal from the AV amplifier 41 becomes discontinuous, losing synchronization, and thus it is necessary to perform a synchronization process again. When, for example, a clock signal from the AV amplifier 41 becomes discontinuous, the HDMI terminal 59 outputs a notification signal for notifying switching of input AV content to the channel switch detection unit 70. Then, when the channel switch detection unit 70 detects the notification signal from the HDMI terminal 59, the channel switch detection unit can detect switching of viewed AV content and supply a detection result to the control unit 64.

Accordingly, for example, if the AV amplifier 41 switches an input from the set-top box 19 to an input from the game device 42, when a data broadcasting app is displayed superimposed on a cable television program in the reception device 12, the data broadcasting app is closed and then a game screen can be displayed.

The reception device 12 of FIG. 20 is configured as described above.

As described above, as a fifth detection method, the reception device 12 can adopt a method of detecting switching of viewed AV content using a selection result of AV content output from the AV amplifier 41, in addition to the first to the fourth detection methods described above.

[Specific Operation Example]

In addition, according to the present technology, since the ACR server 13 identifies AV content without metadata corresponding to the AV content, for example, an operation as below is possible.

Figure 21:
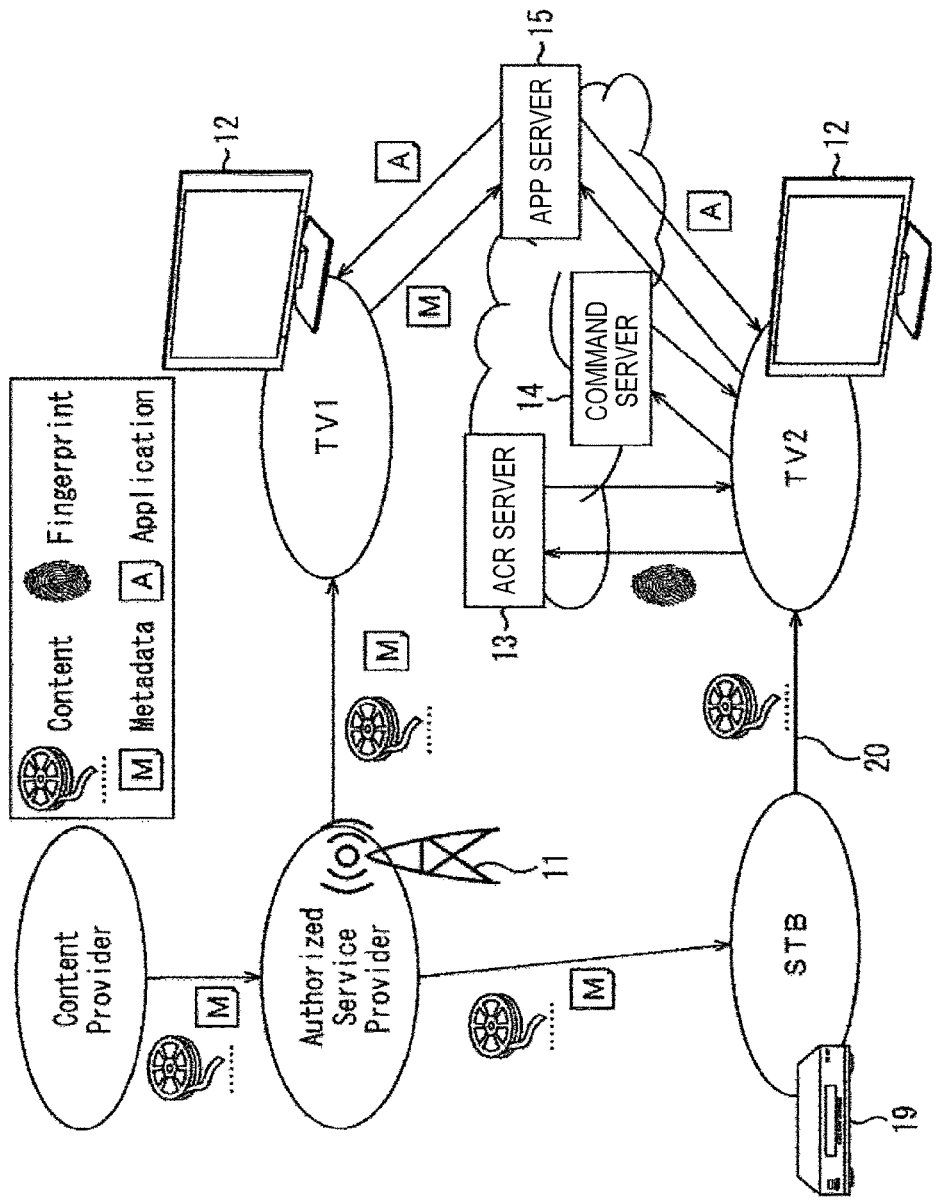
FIG. 21 is a diagram illustrating a specific example of a broadcasting system to which the present technology is applied.

FIG. 21 is a diagram illustrating a specific example of a broadcasting system to which the present technology is applied.

As illustrated in FIG. 21, metadata ("Metadata" in the drawing) relating to a program is given to AV content ("Content" in the drawing) provided by a content provider ("Content Provider), and the reception device 12 ("TV1" in the drawing) that directly receives a digital television broadcast signal from the broadcasting device 11 ("ASP (Authorized Service Provider)" in the drawing) can acquire the metadata transmitted together with the AV content. Thus, by accessing the app server 15 managed by a broadcasting service provider or the like based on the metadata, the reception device can acquire and execute a data broadcasting app ("Application" in the drawing).

On the other hand, when a digital television broadcast signal is received from the broadcasting device 11 via a CATV network, a satellite communication network, or the like, a signal that has been converted by the set-top box 19 ("STB (Set Top Box)" in the drawing) is received by another reception device 12 ("TV2" in the drawing) via the HDMI cable 20. In this case, an output from the set-top box 19 is AV content only, which makes no use of metadata, and accordingly, information relating to a program is not able to be acquired. Thus, the reception device 12 can acquire an identification result by transmitting fingerprint information ("Fingerprint" in the drawing) extracted from the AV content to the ACR server 13. In addition, the reception device 12 acquires a command from the command server 14 according to the identification result from the ACR server 13. Then, the reception device 12 can acquire and execute a data broadcasting app from the app server 15 according to the command from the command server 14.

As described above, even when a program is relayed via the CATV network, the satellite communication network, or the like in the broadcasting system to which the present technology is applied, a service of data broadcasting content executed in linkage with a program can be realized. In other words, the present technology can also be applied not only to a case in which the reception device 12 directly receives a digital television broadcast signal from the broadcasting device 11 but also to a case in which it is difficult to transmit metadata that is supposed to be transmitted with AV content to the reception device 12 due to a use of the set-top box 19 such as the CATV network 18 or the satellite communication network, as illustrated in, for example, FIGS. 1 and 19.

Third Embodiment

[Configuration Example of a Communication System]

Hereinabove, the example in which the reception device 12 receives AV content corresponding to a digital television broadcast signal from the broadcasting device 11 or to a cable television broadcast signal from the CATV device 17 has been described, however, the AV content may set to be distributed based on VOD (Video On Demand) via the Internet 16.

Figure 22:
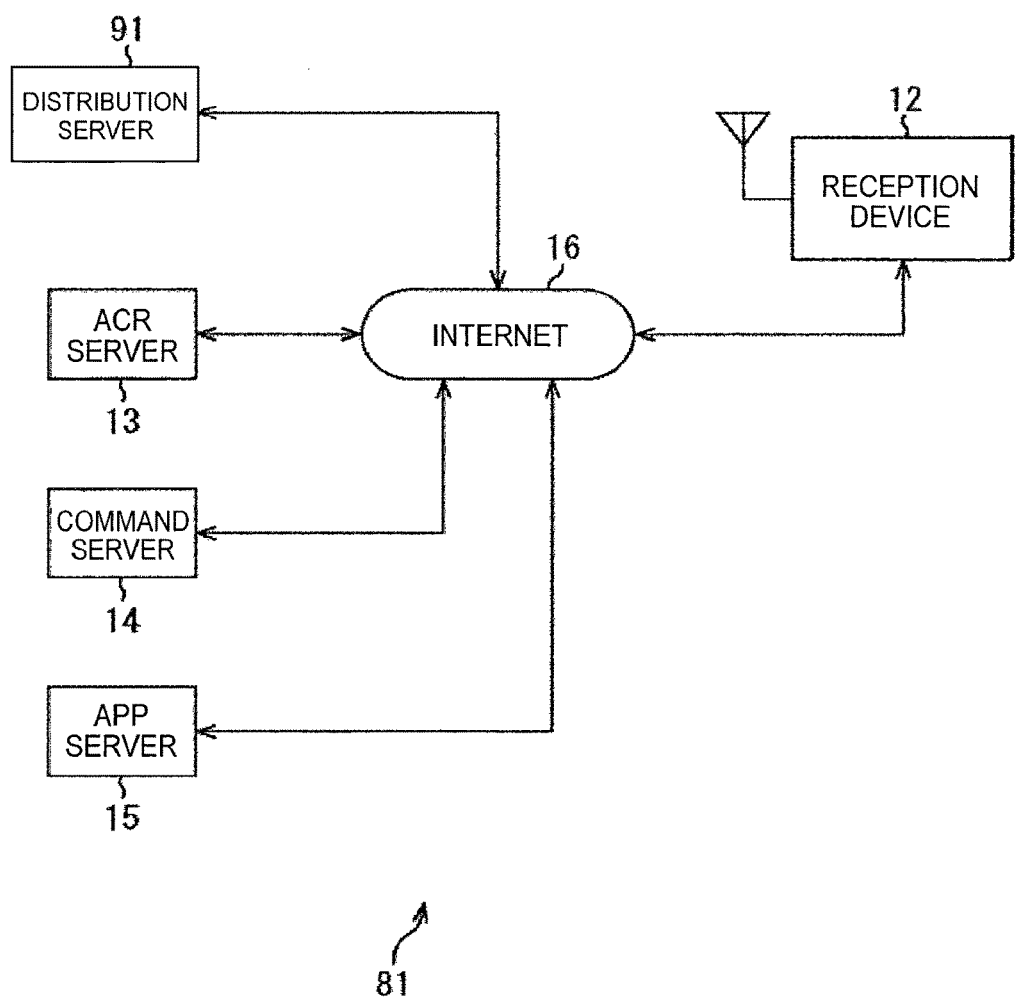
FIG. 22 is a diagram illustrating a configuration example of a communication system.

FIG. 22 illustrates a communication system 81 of the present embodiment.

In FIG. 22, the same reference numerals are given to portions corresponding to those of FIG. 1, and description thereof is appropriately omitted.

In other words, unlike FIG. 1, a distribution server 91 that is connected to the Internet 16 is provided in FIG. 22, instead of the broadcasting device 11, the CATV device 17, the CATV network 18, and the set-top box 19. The distribution server 91 distributes AV content such as VOD content or the like to the reception device 12 via the Internet 16 according to a request from the reception device 12.

The reception device 12 extracts fingerprint information from a video signal and an audio signal of the VOD content from the distribution server 91 and transmits the fingerprint information to the ACR server 13. The ACR server 13 performs the ACR identification result, and here, content identification information, time position information and command acquisition source information are transmitted as identification results. In other words, when AV content from the broadcasting device 11 is acquired, channel identification information is obtained as an identification result, however, when the VOD content from the distribution server 91 is acquired, content identification information such as a content ID or the like is obtained as an identification result.

The reception device 12 accesses the command server 14 corresponding to a URL described in the command acquisition source information to transmit the content identification information and the time position information, and then inquires a command that can be executed in the reception device 12. Then, the reception device 12 controls an operation of a data broadcasting app according to the command from the command server 14.

As described above, the reception device 12 can receive AV content not only via a broadcasting network but also via a communication network. In addition, no matter which network of a broadcasting network or a communication network is used to receive AV content, the ACR server 13 identifies the AV content, and thus the reception device 12 can acquire a command from the command server 14 according to an identification result. In addition, when switching of a channel is detected, the reception device 12 inquires an identification result of the VOD content to the ACR server 13. Furthermore, when the reception device 12 compares content identification information pieces obtained before and after detection of switching of a channel and the channel is switched properly, the reception device can close a data broadcasting app displayed superimposed on the VOD content before the switching of the channel.

Note that, although the example in which a plurality of servers such as the ACR server 13, the command server 14, and the application server 14 are provided depending on functions to be provided has been described above, all or some of the functions (service) may be arranged and provided by one or a plurality of servers.

In addition, the ACR server 13 may transmit an identification result directly to the command server 14, without transmitting the result to the reception device 12. For example, when the reception device 12 transmits fingerprint information to the ACR server 13, the ACR server 13 performs the ACR identification process and then transmits an identification result to the command server 14. Then, the command server 14 transmits a command to the reception device 12 according to the identification result from the ACR server 13. Accordingly, only with the transmission of the fingerprint information by the reception device 12 to the ACR server 13, an operation of acquiring a command from the command server 14 is possible. Furthermore, with transmission of the acquired command of a data broadcasting app by the command server 14 directly to the app server 15, not transmission to the reception device 12, for example, an operation in which the reception device 12 transmits the fingerprint information to the ACR server 13 and then acquires the data broadcasting app from the app server 15 is possible.

Furthermore, in the present embodiment, the reception device 12, the set-top box 19, and the AV amplifier 41 are configured to perform communication based on the HDMI standard, however, a standard of communication is not limited to the HDMI standard, and data communication for video signals, audio signals, and control signals at least between the set-top box 19 and the like may be configured to be possible.

[Configuration Example of Computer to which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 23:
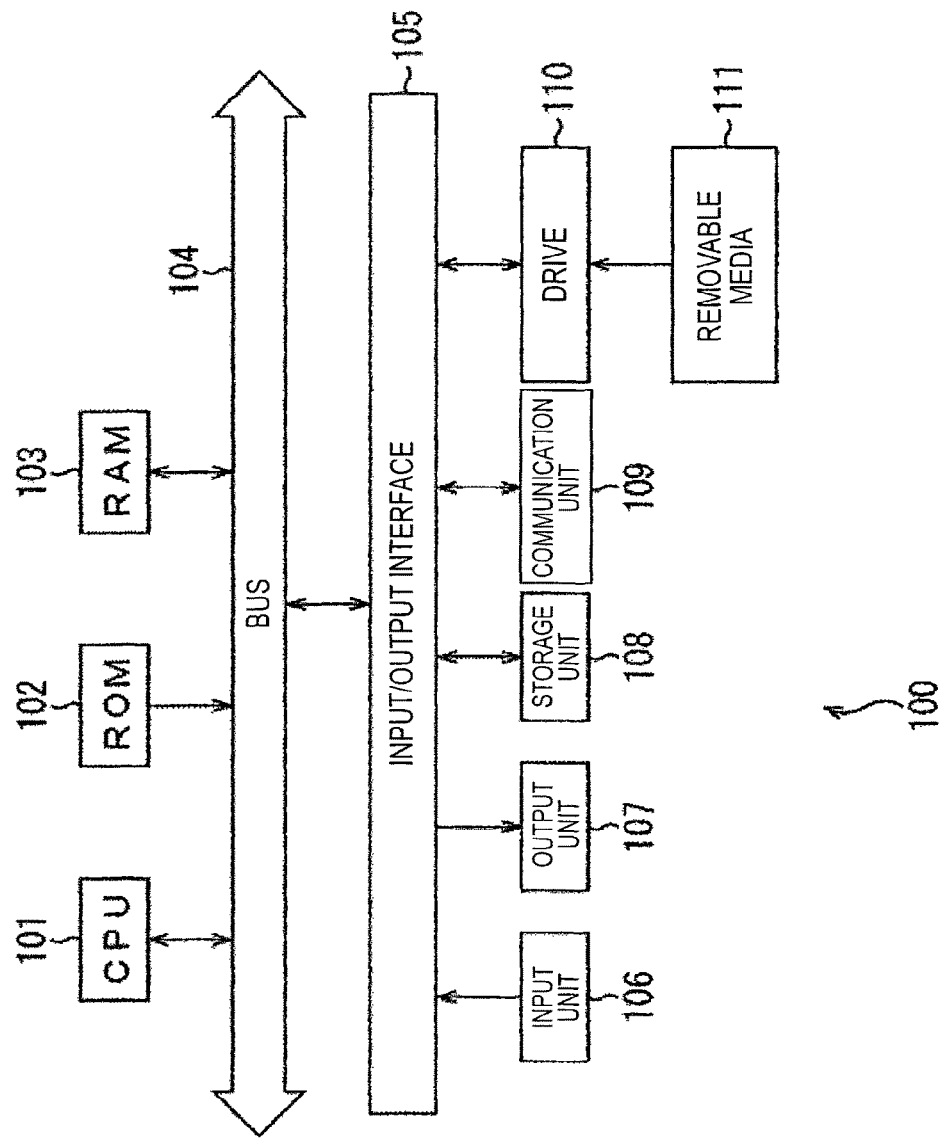
FIG. 23 is a diagram illustrating a configuration example of a computer.

FIG. 23 is a block diagram showing a hardware configuration example of a computer that performs the above-described series of processing using a program.

In the computer 100, a central processing unit (CPU) 101, a read only memory (ROM) 102 and a random access memory (RAM) 103 are mutually connected by a bus 104.

An input/output interface 105 is also connected to the bus 104. An input unit 106, an output unit 107, a storage unit 108, a communication unit 109, and a drive 110 are connected to the input/output interface 105.

The input unit 106 is configured from a keyboard, a mouse, a microphone or the like. The output unit 107 is configured from a display, a speaker or the like. The storage unit 108 is configured from a hard disk, a non-volatile memory or the like. The communication unit 109 is configured from a network interface or the like. The drive 110 drives a removable media 111 such as a magnetic disk, an optical disk, a magneto-optical disk, a semiconductor memory or the like.

In the computer 100 configured as described above, the CPU 101 loads a program that is stored, for example, in the storage unit 108 onto the RAM 103 via the input/output interface 105 and the bus 104, and executes the program. Thus, the above-described series of processing is performed.

Programs to be executed by the computer 100 (the CPU 101) are provided being recorded in the removable media 111 which is a packaged media or the like. Also, programs may be provided via a wired or wireless transmission medium, such as a local area network, the Internet or digital satellite broadcasting.

In the computer 100, by inserting the removable media 111 into the drive 110, the program can be installed in the storage unit 108 via the input/output interface 105. Further, the program can be received by the communication unit 109 via a wired or wireless transmission media and installed in the storage unit 108. Moreover, the program can be installed in advance in the ROM 102 or the storage unit 108.

It should be noted that the program executed by a computer 100 may be a program that is processed in time series according to the sequence described in this specification or a program that is processed in parallel or at necessary timing such as upon calling.

A processing step herein for describing a program which causes the computer 100 to perform various processing does not necessarily have to be processed chronologically in the order described in a flow chart. It also includes processing performed in parallel or individually (for example, parallel processing or processing by an object).

The program may be processed by one computer or by a plurality of computers in a distributed manner. Further, the program may be performed after being transferred to a remote computer.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)

A reception device including:

a reception unit configured to receive AV content;

a feature value extraction unit configured to extract a feature value from data of the received AV content;

an identification result acquisition unit configured to acquire an identification result of the AV content identified using the extracted feature value;

a command acquisition unit configured to acquire a command for controlling an operation of an application program that is executed in linkage with the AV content according to the acquired identification result;

a control unit configured to control the operation of the application program according to the acquired command; and a detection unit configured to detect switching of the AV content being viewed, wherein, when the switching of the AV content is detected, the control unit closes the application program that has been executed in linkage with the AV content.

(2)

The reception device according to (1), wherein the detection unit detects switching of a channel from first AV content to second AV content that is different from the first AV content, and wherein, when the switching of the channel from the first AV content to the second AV content is detected, the control unit closes the application program that has been executed in linkage with the first AV content.

(3)

The reception device according to (2), further including:

a storage unit configured to store first identification information for identifying the first AV content obtained from the identification result of the first AV content, wherein, when the switching of the channel from the first AV content to the second AV content is detected, the feature value extraction unit extracts a feature value from data of the second AV content, wherein the identification result acquisition unit acquires an identification result of the second AV content identified using the extracted feature value, and wherein, when the stored first identification information is different from a second identification result for identifying the second AV content obtained from the identification result of the second AV content, the control unit closes the application program.

(4)

The reception device according to (2) or (3), wherein the reception unit directly receives the AV content transmitted from a transmission device, and wherein, according to an operation on the reception device for switching the channel from the first AV content to the second AV content, the detection unit detects the switching of the channel.

(5)

The reception device according to (2) or (3), wherein the reception unit receives the AV content that has been converted from an information processing device when the reception unit is connected to the information processing device that converts data of the AV content transmitted from a transmission device according to the reception device in a scheme based on an HDMI (High Definition Multimedia Interface) standard, and wherein the detection unit detects the switching of the channel from the first AV content to the second AV content according to an analysis result of a video signal of the AV content received from the information processing device.

(6)

The reception device according to (5), wherein the detection unit detects the switching of the channel by analyzing, based on the video signal of the AV content received from the information processing device, whether a plurality of frames constituting the AV content are continuous in a predetermined section to form a same screen or whether the plurality of frames are continuous in a predetermined section to form a black screen.

(7)

The reception device according to any one of (2), (3), and (5), wherein the detection unit detects the switching of the channel from the first AV content to the second AV content according to an analysis result of an audio signal of the AV content received from the information processing device.

(8)

The reception device according to (7), wherein the detection unit detects the switching of the channel by analyzing, based on the audio signal of the AV content received from the information processing device, whether a sample of the audio signal is in a no signal state in a predetermined section or whether the sample is in a discontinuous state in a predetermined section.

(9)

The reception device according to (2) or (3), wherein the reception unit receives the AV content that has been converted from an information processing device when the reception unit is connected to the information processing device that converts data of the AV content transmitted from a transmission device according to the reception device in a scheme based on an HDMI standard, and wherein, according to an operation on the information processing device for switching the channel from the first AV content to the second AV content, the detection unit detects the switching of the channel.

(10)

The reception device according to (1),
wherein the reception unit receives the AV content output from a selector when the reception unit is connected to the selector that selects desired AV content from a plurality of pieces of AV content input from a plurality of information processing devices and then outputs the desired AV content in a scheme based on an HDMI standard, and
wherein the detection unit detects switching of the AV content being viewed according to a selection result of the AV content provided by the selector.

(11)

The reception device according to any one of (1) to (11), wherein the identification result acquisition unit acquires an identification result of the AV content identified from the extracted feature value using an ACR (Automatic Content Recognition) technology.

(12)

The reception device according to any one of (1) to (11), wherein the feature value extraction unit extracts the feature value from one or both of a video signal and an audio signal of the AV content.

(13)

The reception device according to any one of (1) to (12), wherein the command indicates any of acquisition or registration, acquisition or activation, event triggering, stopping, and closing of the application program, and
wherein the control unit controls acquisition or registration, or acquisition or activation of the application program, or event triggering, pausing, or closing of the application program being executed according to each command.

(14)

A reception method of a reception device, the method, which is performed by the reception device, including the steps of:
receiving AV content;
extracting a feature value from data of the received AV content;
acquiring an identification result of the AV content identified using the extracted feature value;
acquiring a command for controlling an operation of an application program that is executed in linkage with the AV content according to the acquired identification result;
controlling the operation of the application program according to the acquired command;
detecting switching of the AV content being viewed; and
closing the application program that has been executed in linkage with the AV content when the switching of the AV content is detected.

(15)

A program that causes a computer to execute steps of:
receiving AV content;
extracting a feature value from data of the received AV content;
acquiring an identification result of the AV content identified using the extracted feature value;
acquiring a command for controlling an operation of an application program that is executed in linkage with the AV content according to the acquired identification result;
controlling the operation of the application program according to the acquired command;
detecting switching of the AV content being viewed; and
closing the application program that has been executed in linkage with the AV content when the switching of the AV content is detected.

(16)

An information processing system including:
a reception device;
a first information processing device;
a second information processing device; and
a third information processing device,
wherein the reception device includes a reception unit configured to receive AV content, a feature value extraction unit configured to extract a feature value from data of the received AV content, an identification result acquisition unit configured to transmit the extracted feature value to the first information processing device and to thereby acquire an identification result of the AV content identified by the first information processing device using the feature value, a command acquisition unit configured to transmit the identification result acquired from the first information processing device to the second information processing device and to thereby acquire, from the second information processing device, a command for controlling an operation of an application program that is executed in linkage with the AV content according to the identification result, a control unit configured to control the operation of the application program that is acquired from the third information processing device according to the command acquired from the second information processing device, and a detection unit configured to detect switching of the AV content being viewed,
wherein, when the switching of the AV content is detected, the control unit closes the application program that has been executed in linkage with the AV content,
wherein the first information processing device includes a first providing unit configured to provide the identification result obtained by identifying the AV content using the feature value in response to an inquiry from the reception device,
wherein the second information processing device includes a second providing unit configured to provide the command according to the identification result in response to an inquiry from the reception device, and
wherein the third information processing device includes a third providing unit configured to provide the application program according to the command in response to an inquiry from the reception device.

REFERENCE SIGNS LIST 1 broadcasting system
11 broadcasting device
12 reception device
12R remote controller
13 ACR server
14 command server
15 app server
17 CATV device
19 set-top box
19R remote controller
51 tuner
31 speaker
32 display
41 AV amplifier
42 game device
59 HDMI terminal
60 fingerprint extraction unit
61 communication I/F
64 command analysis unit
67 control unit
70 app engine
71 channel switch detection unit 71 light sensing unit
81 communication system
91 distribution server
100 computer
101 CPU

The invention claimed is:
1. A reception device comprising:
a receiver to receive AV content;
processing circuitry to:
  extract a first fingerprint feature value from one or both of an audio signal and a video signal of the received AV content;
  acquire an identification result of the AV content identified using the extracted first fingerprint feature value;
  acquire a command for controlling an operation of an application program that is executed in linkage with the AV content according to the acquired identification result, the application program controls displaying data of the application program superimposed on the received AV content on a display;
  control the operation of the application program according to the acquired command; and
a detector to detect switching of the AV content being viewed,
wherein, when the switching of the AV content is detected, the processing circuitry extracts a second fingerprint feature value from one or both of the audio signal and the video signal, and when the second fingerprint feature value does not match the first fingerprint feature value, confirms that the AV content has been switched, and the processing circuitry forcibly closes the application program that has been executed in linkage with the AV content.

2. The reception device according to claim 1,
wherein the detector detects switching of a channel from first AV content to second AV content that is different from the first AV content, and
wherein, when the switching of the channel from the first AV content to the second AV content is detected, the processing circuitry forcibly closes the application program that has been executed in linkage with the first AV content.

3. The reception device according to claim 2,
wherein the receiver directly receives the AV content transmitted from a transmission device, and
wherein, according to an operation on the receiver for switching the channel from the first AV content to the second AV content, the detector detects the switching of the channel.

4. The reception device according to claim 2,
wherein the receiver receives the AV content that has been converted from an information processor when the receiver is connected to the information processor that converts data of the AV content transmitted from a transmission device according to the reception device in a scheme based on an HDMI (High Definition Multimedia Interface) standard, and
wherein the detector detects the switching of the channel from the first AV content to the second AV content according to an analysis result of a video signal of the AV content received from the information processor.

5. The reception device according to claim 4,
wherein the detector detects the switching of the channel by analyzing, based on the video signal of the AV content received from the information processor, whether a plurality of frames constituting the AV content are continuous in a predetermined section to form a same screen or whether the plurality of frames are continuous in a predetermined section to form a black screen.

6. The reception device according to claim 4, wherein the detector detects the switching of the channel from the first AV content to the second AV content according to an analysis result of an audio signal of the AV content received from the information processor.

7. The reception device according to claim 6, wherein the detector detects the switching of the channel by analyzing, based on the audio signal of the AV content received from the information processor, whether a sample of the audio signal is in a no signal state in a predetermined section or whether the sample is in a discontinuous state in a predetermined section.

8. The reception device according to claim 2,
wherein the receiver receives the AV content that has been converted from an information processor when the receiver is connected to the information processor that converts data of the AV content transmitted from a transmission device according to the reception device in a scheme based on an HDMI standard, and
wherein, according to an operation on the information processor for switching the channel from the first AV content to the second AV content, the detector detects the switching of the channel.

9. The reception device according to claim 1,
wherein the receiver receives the AV content output from a selector when the receiver is connected to the selector that selects desired AV content from a plurality of pieces of AV content input from a plurality of information processors and then outputs the desired AV content in a scheme based on an HDMI standard, and
wherein the detector detects switching of the AV content being viewed according to a selection result of the AV content provided by the selector.

10. The reception device according to claim 1, wherein the processing circuitry acquires the identification result of the AV content identified from the extracted first fingerprint feature value using an ACR (Automatic Content Recognition) technology.

11. The reception device according to claim 1,
wherein the command indicates any of acquisition or registration, acquisition or activation, event triggering, stopping, and closing of the application program, and
wherein the processing circuitry controls acquisition or registration, or acquisition or activation of the application program, or event triggering, pausing, or closing of the application program being executed according to each command.

12. An information processing system comprising:
a receiver to receive AV content;
a first information processing circuitry;
a second information processing circuitry; and
a third information processing circuitry,
wherein the receiver includes processing circuitry to:
  extract a first fingerprint feature value from one or both of an audio signal and a video signal of the received AV content,
  transmit the extracted first fingerprint feature value to the first information processing circuitry and to thereby acquire an identification result of the AV content identified by the first information processing circuitry using the first fingerprint feature value,
  transmit the identification result acquired from the first information processing circuitry to the second information processing circuitry and to thereby acquire, from the second information processing circuitry, a command for controlling an operation of an application program that is executed in linkage with the AV content according to the identification result, the application program controls displaying data of the application program superimposed on the received AV content on a display, control the operation of the application program that is acquired from the third information processing circuitry according to the command acquired from the second information processing circuitry, and a detector to detect switching of the AV content being viewed, wherein, when the switching of the AV content is detected, the processing circuitry extracts a second fingerprint feature value from one or both of the audio signal and the video signal, and when the second fingerprint feature value does not match the first fingerprint feature value, confirms that the AV content has been switched, and the processing circuitry closes the application program that has been executed in linkage with the AV content, wherein the first information processing circuitry provides the identification result obtained by identifying the AV content using the first fingerprint feature value in response to an inquiry from the receiver, wherein the second information processing circuitry provides the command according to the identification result in response to an inquiry from the receiver, and wherein the third information processing circuitry provides the application program according to the command in response to an inquiry from the receiver.

* * * * *